United States Patent
Teranishi et al.

(10) Patent No.: US 8,244,997 B2
(45) Date of Patent: Aug. 14, 2012

(54) STORAGE CONTROLLER, STORAGE SYSTEM, AND STORAGE CONTROLLER CONTROL METHOD

(75) Inventors: Mika Teranishi, Ninomiya (JP); Hiroji Shibuya, Odawara (JP); Takahisa Kimura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 12/068,422

(22) Filed: Feb. 6, 2008

(65) Prior Publication Data

US 2009/0113151 A1    Apr. 30, 2009

(30) Foreign Application Priority Data

Oct. 30, 2007   (JP) ................. 2007-281273

(51) Int. Cl.
 *G06F 12/00*   (2006.01)
(52) U.S. Cl. ...................... 711/162; 711/161
(58) Field of Classification Search .............. 711/161, 711/162
 See application file for complete search history.

(56) References Cited

U.S. PATENT DOCUMENTS

| | | | |
|---|---|---|---|
| 6,901,479 B2 * | 5/2005 | Tomita | 711/114 |
| 7,467,235 B2 | 12/2008 | Kameda | |
| 7,509,468 B1 * | 3/2009 | Dalal et al. | 711/163 |
| 2005/0114411 A1 * | 5/2005 | Childs et al. | 707/204 |
| 2006/0253734 A1 | 11/2006 | Oka | |
| 2007/0043737 A1 | 2/2007 | Nagamatsu et al. | |
| 2007/0074290 A1 | 3/2007 | Kobayashi et al. | |
| 2007/0124407 A1 * | 5/2007 | Weber et al. | 709/212 |
| 2007/0168361 A1 | 7/2007 | Hirakawa et al. | |
| 2007/0266213 A1 * | 11/2007 | Ushijima et al. | 711/162 |
| 2009/0327248 A1 | 12/2009 | Kodama | |

FOREIGN PATENT DOCUMENTS

| | | |
|---|---|---|
| JP | 11-134234 A | 5/1999 |
| JP | 2004-46435 | 7/2002 |
| JP | 2002-278819 A | 9/2002 |
| JP | 2005-18506 | 6/2003 |
| JP | 2005-122702 A | 5/2005 |
| JP | 2005-182683 A | 7/2005 |
| JP | 2007-58346 | 8/2005 |
| JP | 2007-94803 | 9/2005 |
| JP | 2007-065810 A | 3/2007 |

* cited by examiner

*Primary Examiner* — Jared Rutz
*Assistant Examiner* — Gurtej Bansal
(74) *Attorney, Agent, or Firm* — Volpe and Koenig, P.C.

(57) ABSTRACT

A storage controller of the present invention can specify an updated file based on an updated block detected when a differential backup is carried out for a plurality of generations, and can carry out a virus scan for the updated file only. Difference data generated between a primary volume and a backup volume is managed in difference volumes of different generations. A file updated by the host is specified based on an updated block in which the difference data is stored. A virus scan, which makes use of the latest virus pattern file, is executed for this updated file. Furthermore, search information related to the updated file can be created, and this search information can also be saved.

16 Claims, 27 Drawing Sheets

FIG. 3

300
BACKUP CONFIGURATION INFORMATION TABLE

| PVOL# (301) | BVOL# (302) | DIFFERENCE VOL # (303) | NO. OF ACQUIRED GENERATIONS (304) | BACKUP SCHEDULE (305) |
|---|---|---|---|---|
| 101 | 201 | 301 | 3 | 2007/07/01 23:00 |
| 102 | 202 | 302 | 3 | 2007/07/01 23:00 |
| 103 | 203 | 303 | 3 | 2007/07/01 23:00 |
| ... | ... | ... | ... | ... |

310
BACKUP EXECUTION HISTORY MANAGEMENT TABLE

| PVOL# (311) | BVOL# (312) | DIFFERENCE VOL # (313) | DIFFERENCE # (314) | DIFFERENTIAL BACKUP END-TIME (315) | BMP MANAGEMENT # (316) |
|---|---|---|---|---|---|
| 101 | 201 | 301 | 1 | 2007/07/01 23:00 | B101201301-1 |
| 102 | 202 | 302 | 1 | 2007/07/01 23:03 | B102202302-1 |
| 103 | 203 | 303 | 1 | 2007/07/01 23:05 | B103203303-1 |
| 101 | 201 | 301 | 2 | 2007/07/02 23:00 | B101201301-2 |
| 102 | 202 | 302 | 2 | 2007/07/02 23:03 | B102202302-2 |
| 103 | 203 | 303 | 2 | 2007/07/02 23:05 | B103203303-2 |
| 101 | 201 | 301 | 3 | 2007/07/03 23:00 | B101201301-3 |
| 102 | 202 | 302 | 3 | 2007/07/03 23:03 | B102202302-3 |
| 103 | 203 | 303 | 3 | 2007/07/03 23:05 | B103203303-3 |
| ... | ... | ... | ... | ... | ... |

FIG. 5

FILE MANAGEMENT INFORMATION TABLE 340

| BVOL# 341 | FILENAME 342 | BLOCK START LOCATION 343 | BLOCK END LOCATION 344 | CREATION DATE/TIME 345 | UPDATE DATE/TIME 346 | CREATOR 347 |
|---|---|---|---|---|---|---|
| 201 | file1 | 01 | 07 | 2007/04/01 10:10 | 2007/04/23 11:05 | aaa |
| 201 | file2 | 0 | 10 | 2007/05/20 13:15 | 2007/06/18 21:35 | bbb |
| 201 | file3 | 14 | 16 | 2007/06/05 18:45 | 2007/07/01 14:55 | aaa |
| ... | ... | ... | ... | ... | ... | ... |

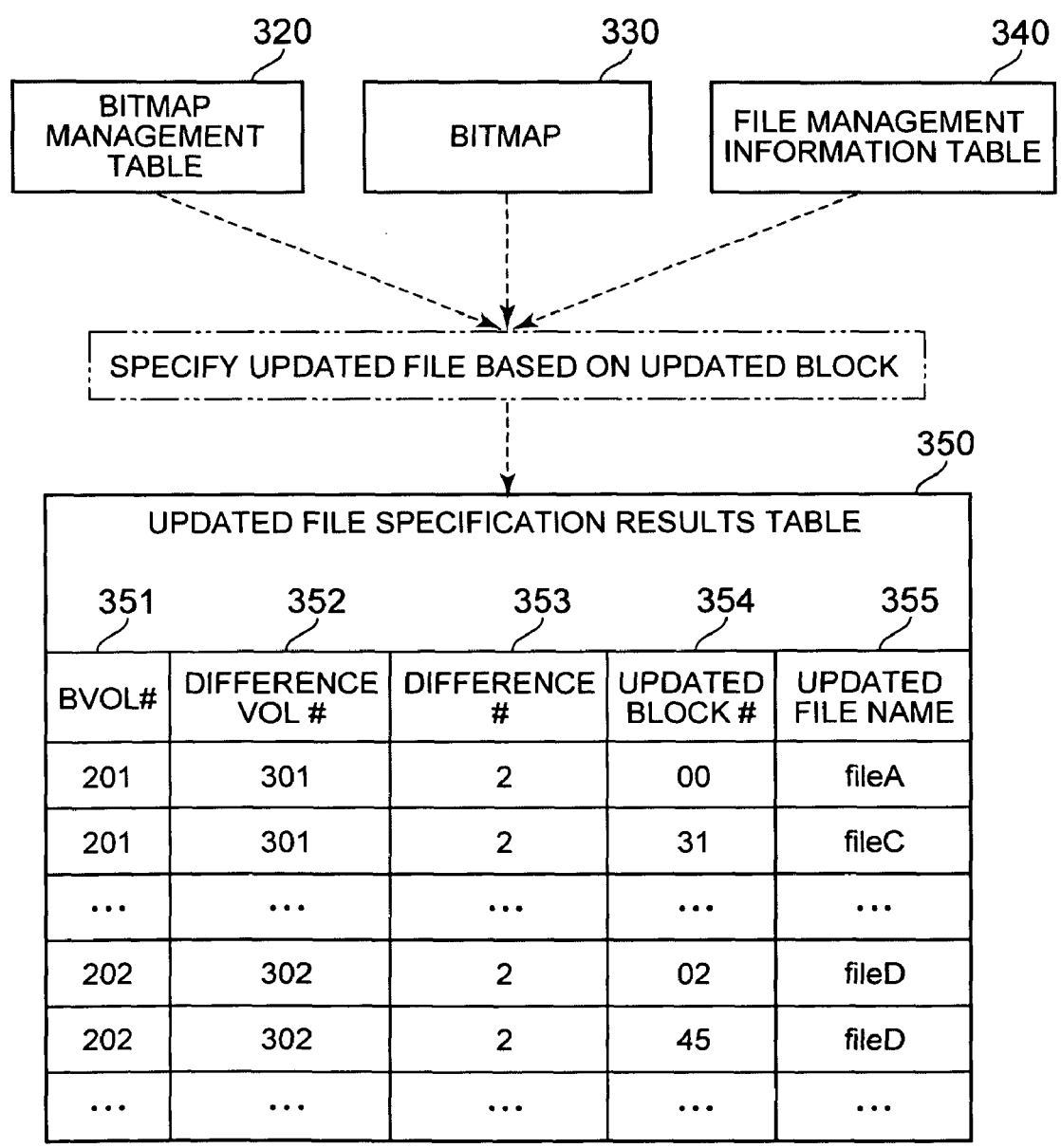

VIRUS PATTERN MANAGEMENT TABLE

| 361 | 362 | 363 | 364 |
|---|---|---|---|
| VIRUS PATTERN FILE # | DELIVERY DATE/TIME | GUARANTEE INFORMATION YES / NO | GUARANTEE TIME |
| 2007-100-001 | 2007/07/01 00:05 | YES | 2007/07/01 00:00 |
| 2007-100-002 | 2007/07/02 00:05 | YES | 2007/06/30 00:00 |
| 2007-100-003 | 2007/07/02 00:05 | NO | — |
| ... | ... | ... | ... |

370

VIRUS SCAN CONFIGURATION MANAGEMENT TABLE

| 371 | 372 | 373 | 374 | 375 | 376 |
|---|---|---|---|---|---|
| CHECK-TARGETED DIFFERENCE VOL # | DIFFERENCE # | SCAN SCHEDULED TIME | VIRUS PATTERN FILE ACQUISITION TIME | RESTORE | DELETE |
| 301 | 1 | 2007/07/01 00:05 | 2007/07/01 00:03 | AUTOMATIC | AUTOMATIC |
| 302 | 1 | 2007/07/02 00:05 | 2007/07/01 00:03 | AUTOMATIC | AUTOMATIC |
| 303 | 1 | 2007/07/01 00:05 | 2007/07/01 00:03 | MANUAL | MANUAL |
| ... | ... | ... | ... | ... | ... |

FIG. 8

VIRUS SCAN EXECUTION RESULTS TABLE 380

| CHECK-TARGETED DIFFERENCE VOL # 381 | DIFFERENCE # 382 | SCAN TIME 383 | VIRUS PATTERN FILE # 384 | INFECTED YES / NO 385 | INFECTED FILE NAME 386 |
|---|---|---|---|---|---|
| 301 | 1 | 2007/07/01 00:30 | 2007-100-001 | NO | — |
| 302 | 1 | 2007/07/01 00:30 | 2007-100-001 | NO | — |
| 303 | 1 | 2007/07/01 00:30 | 2007-100-001 | NO | — |
| 301 | 2 | 2007/07/02 00:30 | 2007-100-002 | YES | file1 |
| 302 | 2 | 2007/07/02 00:30 | 2007-100-002 | NO | — |
| 330 | 2 | 2007/07/02 00:30 | 2007-100-002 | NO | — |
| 301 | 3 | 2007/07/03 00:30 | 2007-100-003 | NO | — |
| 302 | 3 | 2007/07/03 00:30 | 2007-100-003 | YES | file2, file3 |
| ... | ... | ... | ... | ... | ... |

FIG. 9

INFECTED FILE BLOCK DETECTION RESULTS TABLE (390)

| BVOL# (391) | DIFFERENCE VOL # (392) | DIFFERENCE # (393) | SCAN TIME (394) | INFECTED FILE NAME (395) | BLOCK START LOCATION (396) | BLOCK END LOCATION (397) |
|---|---|---|---|---|---|---|
| 201 | 301 | 2 | 2007/07/02 00:30 | file1 | 01 | 06 |
| 203 | 303 | 3 | 2007/07/03 00:30 | file2 | 67 | 78 |
| 203 | 303 | 3 | 2007/07/03 00:30 | file3 | 101 | 114 |
| ... | ... | ... | ... | ... | ... | ... |

INFECTED FILE RESTORE RESULTS TABLE (400)

| BVOL# (401) | DIFFERENCE VOL # (402) | DIFFERENCE # (403) | INFECTED FILE NAME (404) | BLOCK LOCATION (405) | RESTORE (406) | REMOVE (407) |
|---|---|---|---|---|---|---|
| 201 | 301 | 2 | file1 | 01-06 | 2007/07/02 OK | 2007/07/02 OK |
| 203 | 303 | 3 | file2 | 67-78 | 2007/07/03 OK | 2007/07/03 OK |
| 203 | 303 | 3 | file3 | 101-114 | MANUAL | MANUAL |
| ... | ... | ... | ... | ... | ... | ... |

STORAGE CONTROLLER, STORAGE SYSTEM, AND STORAGE CONTROLLER CONTROL METHOD

CROSS-REFERENCE TO RELATED APPLICATION

This application relates to and claims the benefit of priority from Japanese Patent Application number 2007-281273, filed on Oct. 30, 2007, the entire disclosure of which is incorporated herein by reference.

BACKGROUND OF THE INVENTION

1. Field of the Invention

The present invention relates to a storage controller, a storage system, and a storage controller control method.

2. Description of the Related Art

For example, government agencies, private companies and educational institutions handle large amounts of various types of data, and use relatively large-scale storage systems to manage this data. These storage systems comprise at least one storage controller. A storage controller, for example, comprises large numbers of storage devices, and can provide storage areas on the basis of RAID (Redundant Array of Inexpensive Disks). At least one logical device (also called logical volume) is created on the physical storage area provided by a group of storage devices. The writing and reading of data is carried out by a host computer (hereinafter, "host") issuing a write command or a read command to a logical device.

The storage controller is connected to a large number of hosts, and respectively provides volumes to the hosts. Various data utilized by the hosts are stored in the respective volumes. Accordingly, methods for checking inside a storage controller to determine whether or not the data in the volumes has been infected with a computer virus, and for removing a detected computer virus have been proposed (Japanese Laid-open Patent Nos. 2004-46435, 2007-58346, and 2007-94803).

Furthermore, a technique for remote copying data from a storage controller at a primary site to a storage controller at a secondary site is also known (Japanese Patent Laid-open No. 2005-18506).

In the prior art, an entire secondary volume, which, together with a primary volume creates a copy-pair, is checked for computer viruses. Therefore, checking for computer viruses takes time, and increases the load placed on the controller. Further, since a backup process is carried out after the virus check of the entire secondary volume has ended, from the perspective of the host, backup also takes a long time.

SUMMARY OF THE INVENTION

With the foregoing problems in view, an object of the present invention is to provide a storage controller, storage system, and storage controller control method, which make it possible to efficiently carry out a computer virus check in a relatively short period of time by limiting the scope of the computer virus check to a range of data that has been updated. Another object of the present invention is to provide a storage controller, storage system, and storage controller control method capable of using a difference block, which is managed for carrying out a differential backup, to perform respectively different data processing for updated files only. Further objects of the present invention should become clear from the descriptions of the embodiments explained hereinbelow.

To solve for the above-mentioned problems, a storage controller according to a first aspect of the present invention is one which provides a primary volume to a host computer, and comprises a backup controller, which detects a difference block between the primary volume and a backup volume generated as a result of a file update request from the host computer, and which respectively manages the data of the detected difference block as differential backup data of a plurality of generations; an updated-file detector for detecting a file that has been updated by the host computer, based on management information for managing the corresponding relationship between a file and a block, and the detected difference block; a first data processor, which carries out a first data process for checking whether or not the detected updated file is infected with a computer virus; and a file restorer for restoring an infected file which has been determined by the first data processor to be infected with the computer virus.

The updated-file detector can detect the updated file in differential backup data, which has been confirmed as being saved by the backup controller.

The first data processor can perform a check of the updated file using a virus pattern file delivered subsequent to the previous check.

The file restorer can restore the storage content of the infected file to a state where the file is not infected with the computer virus by using either one of a preconfigured first restore method or second restore method.

The virus pattern file comprises guarantee time information, which guarantees a time period during which there is no infection by any of computer viruses included in this virus pattern file, and the first restore method can restore the storage content of the infected file to a state where the file is not infected with the computer virus, by using the data in a block corresponding to the infected file, which is included in the differential backup data that corresponds to the time period specified in the guarantee time information.

The second restore method can detect a block corresponding to the infected file by tracing back differential backup data of past generations in order from the differential backup data of one generation older than the latest generation, and can restore the storage content of the infected file to a state where the file is not infected with the computer virus, by using the data in this detected block.

The storage controller may also comprise a second data processor, which executes a second data process different from the first data process, for the updated file detected by the updated-file detector. The second data process, for example, is one, which creates search information to be used in a file search.

The storage controller can also comprise a search volume for storing search information to be used in a file search, and the second data process can be a process for creating search information and storing this search information in the search volume.

The second data process is one, which creates search information to be used in a file search, and which stores this search information in the search volume, and the search volume can be provided in a different storage controller.

The second data processor can remote copy the results of the second data process to a copy-destination volume in a different storage controller.

A storage system according to a second aspect of the present invention is one, which comprises at least one storage controller, and is a storage system that respectively provides a primary volume and a backup volume to a plurality of host computers, and comprises a backup controller, which respectively detects difference blocks between the primary volume and the backup volume generated as the result of file update requests from the respective host computers, and which respectively manages the data of these detected difference blocks as differential backup data of a plurality of generations; an updated-file detector for respectively detecting files that have been updated by the respective host computers, based on management information for managing the corresponding relationship between files and blocks in respective volume units, and the detected difference blocks; a first data processor, which carries out a first data process for checking whether or not the respective detected updated files are infected with a computer virus; a file restorer for restoring an infected file which has been determined by the first data processor to be infected with the computer virus; a second data processor for respectively executing second data processes for creating search information to be used in a file search for the respective updated files detected by the updated-file detector; a search volume for storing the search information; and a search unit for carrying out a file search based on the search information.

The backup controller, updated-file detector, first data processor, file restorer, and second data processor are respectively provided in a first storage controller, and the search volume and search unit are respectively provided in a second storage controller, and the second data processor can be constituted so as to send and store search information to the search volume by means of a differential remote copy.

A storage controller control method according to a third aspect of the present invention is a method for controlling a storage controller which provides a primary volume to a host computer, and respectively executes a step of processing a file update request from the host computer; a step of detecting a difference block between the primary volume and a backup volume generated by the file update request; a step of respectively managing the data of the detected difference block as differential backup data of a plurality of generations; a step of detecting a file which has been updated by the host computer, based on a management table for managing the corresponding relationship between the file and the block, and the detected difference block; a step of checking whether or not the detected updated file is infected with a computer virus; and a step of restoring an infected file which has been determined to be infected with the computer virus.

Either all or part of the means, functions, and steps of this present invention can be constituted as computer programs executed by a computer system. Either all or part of the constitution of the present invention can be constituted from a computer program, and this computer program, for example, can be affixed and delivered on a variety of storage media, or sent via a communication network.

BRIEF DESCRIPTION OF THE DRAWINGS

FIG. 3 is a schematic diagram showing a backup configuration information table and a backup execution history management table;

FIG. 5 is a schematic diagram showing a file management table;

FIG. 6 is a schematic diagram of a table showing updated file specification results;

FIG. 7 is a schematic diagram showing a virus pattern management table and a virus scan configuration management table;

FIG. 8 is a schematic diagram showing a table for managing virus scan execution results;

FIG. 9 is a schematic diagram respectively showing a table for managing detection results for a block corresponding to an infected file, and a table for managing the restore results for an infected file;

DESCRIPTION OF THE SPECIFIC EMBODIMENT

Figure 1:
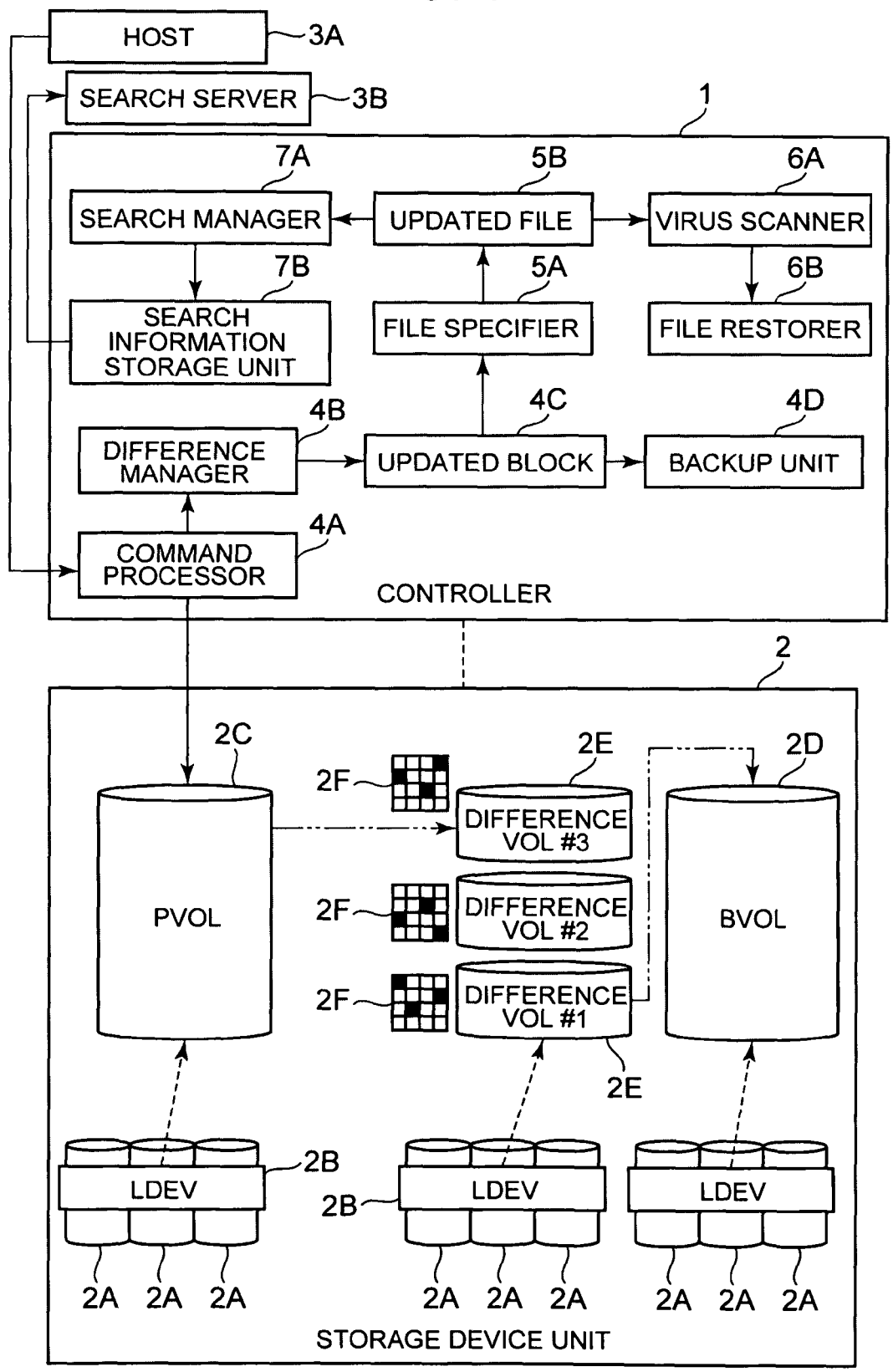
FIG. 1 is a schematic diagram showing an overall outline of an embodiment of the present invention.

FIG. 1 is a block diagram showing an overall outline of an embodiment of the present invention. A storage controller related to this embodiment comprises a controller 1 and a storage device unit 2. The controller 1 is respectively connected to a host 3A and a search server 3B. The controller 1 and storage device unit 2 can both be provided inside the same enclosure, or can each be provided inside a separate enclosure. The controller 1 and storage device unit 2, for example, are connected using a FC_SAN (Fibre Channel_Storage Area Network), IP_SAN (Internet Protocol_SAN), or other such communication channel. The storage device unit 2 will be explained first, and the controller 1 will be explained subsequently.

The storage device unit 2 comprises a plurality of storage devices 2A. Either one or a plurality of logical volumes 2B can be provided as logical devices on top of the physical storage areas of the respective storage devices 2A. A logical volume 2B, for example, can be provided on redundant physical storage areas, such as RAID 1, RAID 5, or RAID 6. In the following explanation, a "logical volume" may be abbreviated as "volume". Further, in the figures, a logical volume serving as a logical device will be expressed as "LDEV". A logical device (LDEV) is made correspondent to a LUN (Logical Unit Number), and is recognized by the host 3A. A logical device, which has been made correspondent to a LUN, is a logical volume, and will be abbreviated in the figures as either "LU" or "VOL".

Various types of devices capable of reading and writing data can be used as a storage device 2A, such as, for example, a hard disk device, semiconductor memory device, optical disk device, magneto-optical disk device, magnetic tape device, flexible disk device, and so forth.

When a hard disk device is used as a storage device, for example, it is possible to use a FC (Fibre Channel) disk, SCSI (Small Computer System Interface) disk, SATA disk, ATA (AT Attachment) disk, or SAS (Serial Attached SCSI) disk.

When a semiconductor memory device is used as a storage device, for example, it is possible to use flash memory, FeRAM (Ferroelectric Random Access Memory), MRAM (Magnetoresistive Random Access Memory), Ovonic Unified Memory, RRAM (Resistance RAM), and other types of memory devices. Furthermore, the type of storage device is not limited to the above devices, and it should also be possible to use other types of storage devices produced in the future.

The controller 1 can use the plurality of storage devices 2A mounted in the storage device unit 2, and can create a plurality of primary volumes 2C, a plurality of backup volumes 2D and a plurality of difference volumes 2E.

A primary volume 2C is a volume utilized by the host 3A, and stores various files, which are written and read by the host 3A. A backup volume 2D is a volume for storing the storage content of a primary volume 2C at a prescribed point in time.

A difference volume 2E is a volume for storing difference data generated between a primary volume 2C and a backup volume 2D. A plurality of difference volumes 2E can be provided. The backup generations of data can be managed by the number of difference volumes 2E. Since three difference volumes 2E are shown in FIG. 1, the storage content of the primary volume 2C can be saved as three generations, a first generation, a second generation, and a third generation.

Differences between the primary volume 2C and the backup volume 2D in each generation are managed by a difference bitmap 2F for specifying difference-generated blocks. The blackened blocks in the difference bitmaps 2F are difference-generated blocks. When the data of a block of the primary volume 2C is updated by the host 3A subsequent to the storage content of the primary volume 2C and the backup volume 2D having been synchronized, this updated block becomes a difference block. Therefore, in the following explanation, a difference-generated block will be called either a "difference block" or an "updated block".

The constitution of the controller 1 will be explained. As will become clear from the embodiments explained hereinbelow, the controller 1 is constituted as a computer system, comprising a microprocessor, a memory, and a communication controller.

Focusing on controller 1 functions, the controller 1, for example, comprises a command processor 4A, a difference manager 4B, a backup unit 4D, a file specifier 5A, a virus scanner 6A, a file restorer 6B, a search manager 7A, and a search information storage unit 7B.

The command processor 4A is for receiving and processing a read command or a write command issued from the host 3A or the search server 3B, and responding with the results of this processing.

The difference manager 4B and backup unit 4D are equivalent to the "backup controller". The difference manager 4B detects a block 4C updated by a file update request (write command) issued to the primary volume 2C. The location of the updated block 4C inside the volume is recorded in the difference bitmap 2F. The data of the detected updated block 4C is stored in the difference volume 2E.

The backup unit 4D, for example, saves difference data (differential backup data) currently being managed in accordance with either a preset backup schedule, or a backup request issued from the host 3A. By this processing, the confirmed generation difference data is saved. Writing the oldest generation difference data to the backup volume 2D can advance the contents stored in the backup volume 2D to the point in time of the oldest generation. Then, deleting the contents stored in the oldest generation difference volume 2E makes it possible to use this difference volume 2E for managing a new generation of difference data.

The file specifier 5A is equivalent to the "updated-file detector". The file specifier 5A detects an updated file 5B based on the updated block 4C detected by the backup controller. As will become clear from the embodiments explained hereinbelow, the block into which the data of a file is written can be managed by a table. The file specifier 5A specifies an updated file 5B, which corresponds to an updated block 4C, by using the table for managing the corresponding relationship between the file and the block.

The virus scanner 6A is equivalent to the "first data processor". A virus scan for checking whether or not a file is infected with a computer virus is equivalent to the "first data process". The virus scanner 6A executes a virus scan only for an updated file 5B.

The file restorer 6B is equivalent to the "file restorer". When the virus scanner 6A detects a file that is infected with a computer virus, the file restorer 6B restores the storage content of this infected file to the storage content of prior to the file being infected with the computer virus. As will become clear from the embodiments explained hereinbelow, the file restorer 6B can restore an infected file via at least two methods.

The search manager 7A is equivalent to the "second data processor". The search manager 7A creates search information for use in a file search only for an updated file 5B. The search information storage unit 7B is equivalent to the "search volume". The search information storage unit 7B stores the search information created by the search manager 7A.

Search information, for example, can comprise a filename, a file path for accessing this file, the time at which the file was created, the time at which the file was updated, the file size, the file type, the name of the file owner, a file summary, a file keyword, and the number of times the file has been accessed. Further, to provide for full text and image searches, the images and textual data inside the file can also be used as search information.

The search server 3B can search for a file matching a search condition from among a large number of files, which are managed by the storage controller, by retrieving the search information stored in the search information storage unit 7B.

Furthermore, as will become clear from the embodiments explained hereinbelow, the function for carrying out a file search (search engine) can also be provided inside the storage controller. Further, the search information storage unit 7B can also be provided in a storage controller that is different from the storage controller that carries out differential backup.

This embodiment, which is constituted in this way, provides the following effects. In this embodiment, backup control for managing the differential backups of a plurality of generations is used to detect an updated file 5B, which corresponds to an updated block 4C, and the detected updated file 5B is subjected to a virus scan. Therefore, a virus scan can be carried out efficiently in a shorter period of time than it takes to perform a virus scan of the entire backup volume 2D. Further, the virus scan is carried out inside the storage controller, thereby making it possible to prevent an increase in the load placed on the host 3A, and to prevent an increase in traffic over the communication network connecting the host 3A and the controller 1.

In this embodiment, as will become clear from the embodiments explained hereinbelow, when a differential backup save has been confirmed, the updated file 5B is detected on the basis of the updated block 4C included in this differential backup, and a virus scan is executed for the updated file 5B. Therefore, management of the latest generation of difference data can be done independently of the virus scan of the updated file 5B. That is, the virus scan can be performed with little effect on the backup control.

In this embodiment, as will become clear from the embodiments explained hereinbelow, the file restorer 6B can restore the storage content of a file which has been infected with a computer virus, by using one of two types of preset methods. Therefore, it is possible to restore an infected file without increasing the load on the host 3A, thereby enhancing usability.

In this embodiment, the virus scanner 6A and search manager 7A execute respectively different data processing using the respective updated files 5B specified by the file specifier 5A. Therefore, different data processing 6A, 7A can be respectively executed using common updated files 5B, enabling efficient use of the storage controller's computer resources.

In this embodiment, search information is created and saved only for an updated file 5B. Therefore, search information can be more efficiently acquired than when the search information is collected from all the files inside all the volumes in the storage controller. This embodiment will be explained in detail below.

[First Embodiment]

Figure 2:
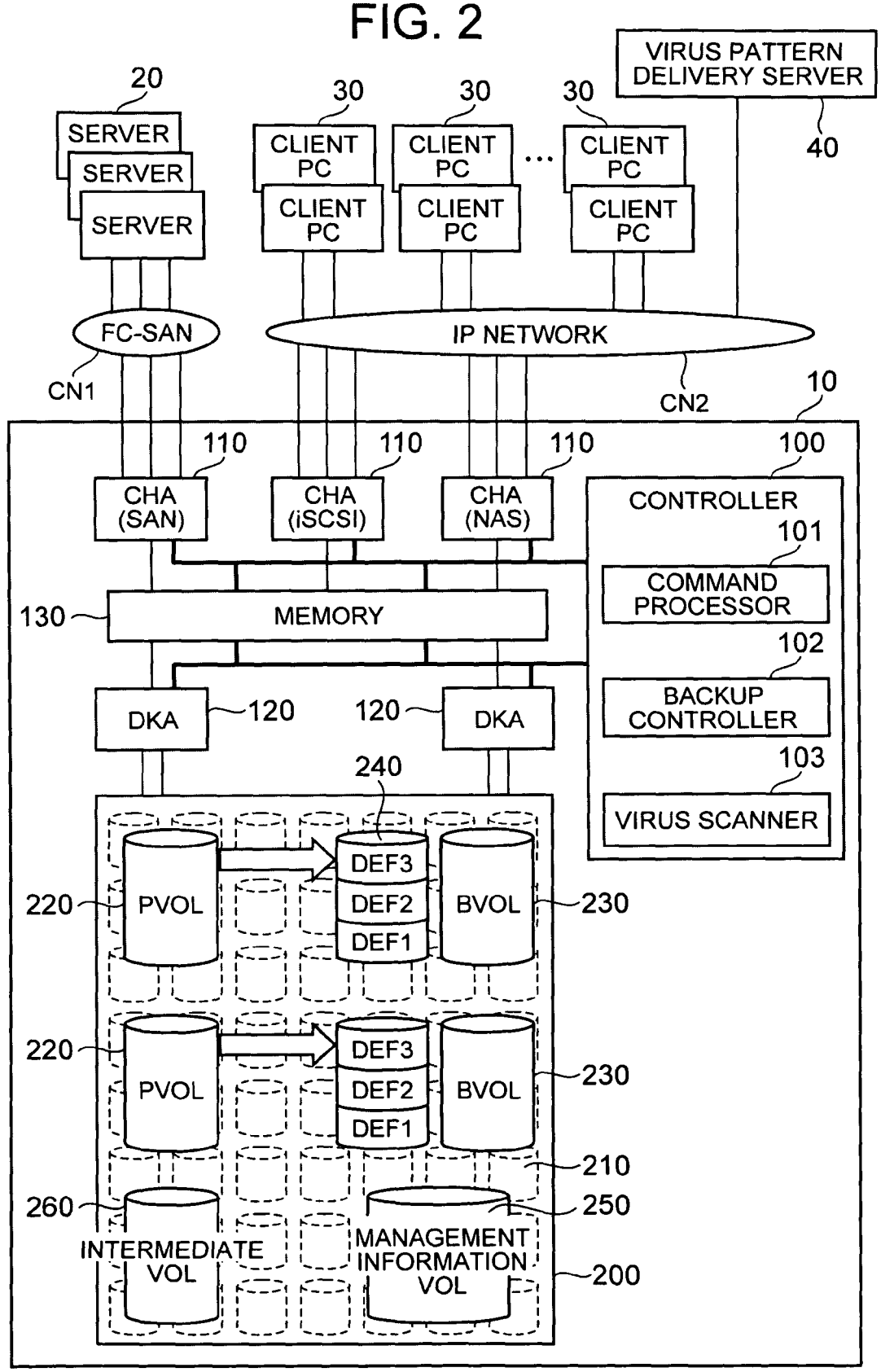
FIG. 2 is a block diagram of a storage system.

FIG. 2 is a schematic diagram showing the overall outline of a storage system according to this embodiment. The corresponding relationships with FIG. 1 will be explained. The controller 100 of FIG. 2 corresponds to the controller 1 of FIG. 1, the storage device unit 200 of FIG. 2 corresponds to the storage device unit 2 of FIG. 1, the servers 20 and client PCs (personal computer) 30 of FIG. 2 correspond to the host 3A of FIG. 1, and the storage devices 210 of FIG. 2 correspond to the storage devices 2A of FIG. 1.

Furthermore, the command processor 101 of FIG. 2 can correspond to the command processor 4A of FIG. 1. However, the read command and write command described for FIG. 1 are processed in accordance with the coordinated efforts of a channel adapter 110 and disk adapter 120, which will be explained hereinbelow. The command processor 101 shown in FIG. 2 is for indicating the execution of a backup to the backup controller 102.

Furthermore, the backup controller 102 of FIG. 2 corresponds to the difference manager 4B and backup unit 4D of FIG. 1, and the virus scanner 103 of FIG. 2 corresponds to the virus scanner 6A of FIG. 1.

The backup controller 102 of FIG. 2 also corresponds to the file restorer 6B of FIG. 1. That is, in this embodiment, a file which has been infected with a computer virus, is restored to a state where the file is not infected with the computer virus by the backup controller 102. Furthermore, the backup controller 102 also corresponds to the file specifier 5A of FIG. 1. That is, in this embodiment, an updated file corresponding to an updated block is specified by the backup controller 102.

The storage controller 10, for example, is connected to a large number of servers 20 and a large number of client PCs 30. The servers 20, for example, can include a design server or development server, which utilizes design data and program source code, or an accounting server, e-mail server, and so forth. The respective servers 20, for example, are connected to the storage controller 10 via a FC_SAN or other such communication network CN 1.

The client PCs 30, for example, are personal computers used by the respective employees. The client PCs 30, for example, are connected to the storage controller 10 via a LAN (Local Area Network), or an IP (Internet Protocol) communication network CN 2, such as the Internet.

In the following explanation, for the sake of convenience, the computer device used to issue a command to the storage controller 10 may be referred to generically as the host.

A client PC 30 can be constituted as a so-called diskless computer. A diskless computer is one, which is not provided with an auxiliary storage device, and which accesses a volume inside the storage controller 10 using a communication network. Although omitted from FIG. 2, the constitution can also be such that a so-called blade server is interposed between a client PC 30 and the storage controller 10.

A virus pattern delivery server 40 is a server for delivering a virus pattern file for detecting a computer virus to the virus scanner 103.

The constitution of the storage controller 10 will be explained. The storage controller 10, for example, can be constituted comprising a controller 100, a channel adapter 110, a disk adapter 120, a memory 130, and a storage device unit 200.

The controller 100 is a computer device for controlling the operation of the storage controller 10. The controller 100 is connected to the respective channel adapters 110, the respective disk adapters 120, and the respective memories 130. The controller 100, for example, comprises the command processor 101, the backup controller 102, and the virus scanner 103.

The command processor 101 indicates the execution of a backup to the backup controller 102 based on a backup request issued from the server 20. Furthermore, the command processor 101 can also collect and manage the various states inside the storage controller 10. The collected information can be sent to an external management server. Furthermore, the constitution can also be such that the command processor 101 processes various types of common commands, such as a read command and write command.

The backup controller 102 manages a differential backup schedule and a virus scan schedule, manages the corresponding relationship between a file and a block, and restores a file that has been infected with a computer virus.

The virus scanner 103 is for executing a virus scan of an updated file. The virus scanner 103 acquires a virus pattern file from the delivery server 40, checks only an updated file against the latest virus pattern file, and saves the results of this check.

The channel adapter (hereinafter, CHA) 110 is a first communication control circuit for carrying out communications among the server 20, client PC 30 and virus pattern delivery server 40. The disk adapter (hereinafter, DKA) 120 is a second communication control circuit for carrying out communications with the respective storage devices 210 inside the storage device unit 200.

The respective CHA 110 can be provided for a communication protocol or for each application. For example, the CHA 110 (SAN) shown in the left side of FIG. 2 is for data communications with the server 20 based on the FC protocol. The CHA 110 (iSCSI) shown in the center of FIG. 2 is for data communications with the respective client PCs 30 based on iSCSI (internet Small Computer System Interface). The CHA 110 (NAS) shown in the right side is for providing NAS (Network Attached Storage) services to the respective client PCs 30.

Furthermore, the connection configuration shown in FIG. 2 is one example, and the present invention is not limited to this configuration. For example, the configuration can also be such that the server 20 makes use of NAS services via the IP network CN 2, and the client PC 30 access the storage controller 10 via the FC_SAN.

The memory 130 stores data received from the hosts (20, 30, 40), and data read out from the storage devices 210. In the figure, only one memory 130 is shown, but in actuality a plurality of memories 130 can be provided. The memory 130 can also store at least a portion of the information used for management, which will be explained hereinbelow. The memory 130 is constituted from either a rewriteable nonvolatile or a volatile memory device.

An example of command processing by the CHA 110, DKA 120 and memory 130 will be briefly explained here. For example, when the host specifies a volume number and issues a write command, the CHA 110 receives this write command, and determines whether or not the write data is capable of being received.

When the memory 130 is able to accept the write data, the CHA 110 receives the write data from the host, and stores the write data and write command in the memory 130. The CHA 110 can notify the host to the extent that write command processing has ended at the point in time when the write data has been stored in the memory 130. Or, the CHA 110 can notify the host that write command processing has ended after confirming that the below-described destage process has ended.

The DKA 120 constantly references the memory 130, and upon discovering an unprocessed write command, reads the write data stored in the memory 130, converts the logical address to a physical address, and writes the write data to a prescribed storage device 210. The prescribed storage device 210 is the storage device, which corresponds to the volume specified in the write command. The process for writing the write data to the storage device 210 is called a destage process. The DKA 120 stores information to the effect that write command processing has ended in the memory 130. Consequently, the CHA 110 confirms that write command processing has ended.

When a read command is issued from the host, the CHA 110 stores this read command in the memory 130. The DKA 120, upon discovering the unprocessed read command in the memory 130, reads out the data from the storage device 210 corresponding to the specified volume, and stores this data in the memory 130. The DKA 120 also stores information to the effect that read command processing has ended in the memory 130. The CHA 110 reads out the data from the memory 130, and sends the data to the host that issued the read command.

The configuration of the storage device unit 200 will be explained. The storage device unit 200 comprises a large number of storage devices 210. The storage devices 210, for example, constitute hard disk devices, flash memory devices, and so forth, just like the storage devices 2A of FIG. 1. The configuration can also be such that a plurality of types of storage devices having different storage principles, like the hard disk device and flash memory device, are used together.

A volume can be created as a logical device using the physical storage area of a storage device 210. The volumes shown in FIG. 2 include a primary volume 220, a backup volume 230, a difference volume 240, a management information volume 250, and an intermediate volume 260.

The primary volume 220 is the volume used by the host, and stores a variety of data. The backup volume 230 is for storing the storage content of the primary volume 220 at a prescribed point in time. The difference volume 240 is for storing the difference data of each respective generation.

The backup controller 102 detects the difference data between the storage content of the primary volume 220 and the storage content of the backup volume 230, and stores this difference data in the difference volume 240. Further, the location of a difference-generated block is recorded in the difference bitmap.

When the execution of a backup is requested by the host, the backup controller 102 suspends difference management for the difference volume 240 in which the latest difference data is stored, and confirms the storage of the backup data, which is stored in this difference volume 240. Then, the backup controller 102 begins managing the next generation of difference data using another new difference volume 240. One difference volume 240 stores one generation's worth of differential backup data.

The storage content of a specified generation can be restored using the storage content of the backup volume 230, the differential backup data of the respective generations, and the difference bitmaps of the respective generations. The storage content of the specified generation (that is, the specified point in time) is restored inside the intermediate volume 260. If the user so desires, the storage content of the specified generation, which has been restored inside the intermediate volume 260, can also be copied to the primary volume 220.

Increasing the number of difference volumes 240 makes it possible to increase the number of restorable points in time (generations). However, increasing the number of difference volumes 240 consumes that much more of the storage device unit's 200 storage capacity.

The management information volume 250 is for storing various types of management information used by the storage controller 10. As will be explained hereinbelow, management information can include a backup configuration information table 300, a backup execution history management table 310, a bitmap management table 320, a difference bitmap 330, and a file management information table 340.

A portion of the management information stored in the management information volume 250 is copied to the memory 130 and used, this management information is updated in the memory 130, and the updated management information is written back to the management information volume 250.

The various types of management information stored in the management information volume 250 will be explained. FIG. 3 shows both a backup configuration information table 300 and a backup execution history management table 310.

The backup configuration information table 300 manages information related to the configuration of a differential backup. The backup configuration information table 300, for example, correspondently manages a primary volume number 301, a backup volume number 302, a difference volume number 303, the number of acquired generations 304, and a backup schedule 305.

The primary volume number 301 is information for specifying the primary volume 220 which constitutes the backup source. The backup volume number 302 is information for specifying the backup volume 230, in which the storage content of the primary volume 220 specified by the primary volume number 301 is to undergo a full backup. The difference volume number 303 is information for specifying the difference volume 240 for storing the difference data generated between the primary volume 220 and the backup volume 230. The number of acquired generations 304 shows the number of generations, which acquire a differential backup. The backup schedule 305 is information showing the scheduled date/time for acquiring a differential backup.

The backup execution history management table 310 is for managing the history of differential backup execution results. The backup execution history management table 310, for example, correspondently manages a primary volume number 311, a backup volume number 312, a difference volume number 313, a difference number 314, a differential backup end-time 315, and a difference bitmap management number 316.

The primary volume number 311, backup volume number 312, and difference volume number 313 are information for respectively specifying the number of a primary volume 220, the number of a backup volume 230 and the number of a difference volume 240, the same as above.

The difference number 314 shows the utilization sequence of the plurality of difference volumes 240, which have been made correspondent to the backup volume 230. For example, when three difference volumes 240 are correspondent to the backup volume 230, a "1" is configured in the difference number of the difference volume 240 used in a first differential backup, a "2" is configured in the difference number of the difference volume 240 used in a second differential backup, and a "3" is configured in the difference number of the difference volume 240 used in a third differential backup.

The third difference volume 240 (#3) manages the latest generation of difference data, and sequentially stores the difference data currently being generated. The first difference volume 240 (#1) manages the oldest generation of difference data.

As will also be explained using the flowchart described hereinbelow, when the execution of a backup is requested, the storage content (differential backup data) of the oldest generation difference volume 240 (#1) is written to the backup volume 230. Consequently, the storage content of the backup volume 230 advances to the point in time when the oldest generation differential backup was acquired.

Furthermore, in the following explanation, for example, the updating of the storage contents of the backup volume 230 by writing differential backup data to the backup volume 230 may be expressed as "reflecting the storage content of the difference volume in the backup volume".

After reflecting the storage content of the oldest generation difference volume 240 (#1) in the backup volume 230, the writing of difference data to the difference volume 240 (#3), which is managing the latest generation of difference data, is halted. Consequently, the storage content (differential backup data) of the difference volume 240 (#3) is affixed at the time when the backup was requested, and the storage of this storage content is confirmed.

Since the storage content of the oldest generation difference volume 240 (#1) is not necessary, this storage content is deleted and is used to manage the difference data of the next generation, which will start at this point. The difference number of the difference volume 240 in which the difference number "2" was set is changed to "1", the difference number of the difference volume 240 in which the difference number "3" was set is changed to "2", and the difference number of the difference volume 240 in which the difference number "1" was set is changed to "3", respectively.

The differential backup end-time 315 shows the date/time at which a differential backup ended. The difference bitmap management number 316 is information for specifying the difference bitmap (BMP in the figure) 330, which was used in a differential backup. Accordingly, the difference bitmap (may be abbreviated as bitmap hereinafter) will be explained next.

Figure 4:
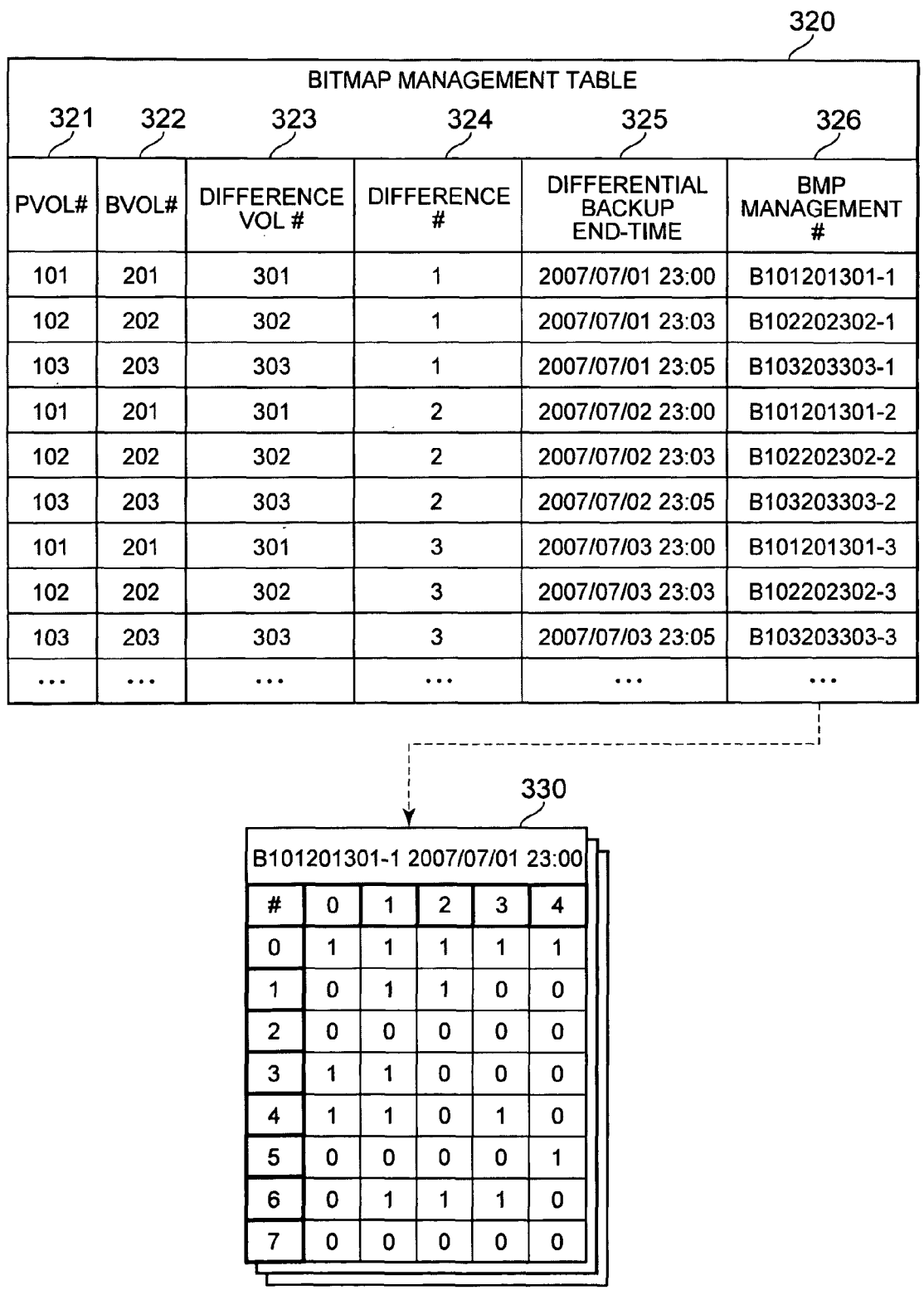
FIG. 4 is a schematic diagram showing a bitmap management table and a difference bitmap.

FIG. 4 shows a bitmap management table 320 and a difference bitmap 330. The bitmap management table 320 is for managing the difference bitmaps 330 used in respective differential backups. The bitmap management table 320, for example, correspondently manages a primary volume number 321, a backup volume number 322, a difference volume number 323, a difference number 324, a differential backup end-time 325, and a difference bitmap management number 326. That is, in this embodiment, the bitmap management table 320 is constituted the same as the backup execution history management table 310.

The primary volume number 321, backup volume number 322, difference volume number 323, difference number 324, differential backup end-time 325, and difference bitmap management number 326 respectively correspond to 311, 312, 313, 314, 315, and 316 shown in FIG. 3, and as such, explanations thereof will be omitted.

The difference bitmap 330 is information for managing the block, of the respective blocks constituting the primary volume 220, which has been updated. A "1" is configured in an updated block, and a "0" is configured in a non-updated block. To facilitate the explanation, the size of the volume in FIG. 4 is given as five blocks horizontally, and eight blocks vertically, but in actuality, the volume is comprised of a larger number of blocks.

FIG. 5 is a schematic diagram showing a file management information table 340. The file management information table 340 is for managing file management information. The file management information table 340, for example, correspondently manages a backup volume number 341, a filename 342, a block start-location 343, a block end-location 344, a creation date/time 345, an update date/time 346, and a creator 347.

The backup volume number 341 is information for specifying the backup volume 230 of a file storage destination. Filename 342 is information for specifying a stored file. For the sake of convenience, simplified filenames are shown in FIG. 5, but the file path for accessing a file can also be stored in the filename 342.

The block start-location 343 is information for specifying the first block of a plurality of blocks in which a file is stored. The file end-location 344 is information for specifying the last block of the respective blocks in which a file is stored.

The creation date/time 345 shows the date and time at which a file was created. The update date/time 346 shows the date and time at which a file was last updated. The creator 347 is information for specifying the user or section that created a file. Furthermore, the attributes shown in FIG. 5 are examples, and attributes other than those shown in FIG. 5 can also be managed in the file management information table 340.

The file management information table 340 can be used to discern the corresponding relationship between a block and a file. That is, when the host updates a certain file inside the primary volume 220, at least a portion of the respective blocks in which the data of this file is stored is updated. The blocks that were updated are managed by the difference bitmap 330. Therefore, the file management information table 340 can be used to specify the file that was updated based on the blocks that were updated.

FIG. 6 is a table 350 for managing the results of update file specification. This table 350 manages information related to an updated file, which was specified based on an updated block. As described hereinabove, it is possible to specify the file corresponding to an updated block based on the bitmap management table 320, the difference bitmap 330 and the file management information table 340, and the results of this specification are stored in table 350.

Table 350, for example, correspondently manages a backup volume number 351, a difference volume number 352, a difference number 353, an updated block number 354, and an updated filename 355.

Since the backup volume number 351, difference volume number 352, and difference number 353 are respectively as described hereinabove, explanations thereof will be omitted. The updated block number 354 is information for specifying a block that has been updated. The updated filename 355 is information for specifying the file corresponding to the updated block.

FIG. 7 shows a virus pattern management table 360. The virus pattern management table 360 is for managing a virus pattern file. The virus pattern management table 360, for example, correspondently manages a virus pattern file number 361, a delivery date/time 362, the presence or absence of guarantee information 363, and a guarantee time 364.

The virus pattern file number 361 is information for identifying respective virus pattern files. The delivery date/time 362 is the date and time at which a virus pattern file was delivered from the delivery server 40. The presence or absence of guarantee information 363 shows whether or not guarantee information has been configured in a virus pattern file. When guarantee information is configured in the virus pattern file, the guarantee time 364 shows the reference time for a period during which it is guaranteed that a file was not infected with a virus.

Guarantee information is information for guaranteeing the user that a file was not infected with a computer virus up until a certain point in time (guarantee time) at which a virus scan was carried out using this virus pattern file. Guarantee information is configured in a virus pattern file by the vendor that delivers the virus pattern file.

A virus pattern file comprises virus patterns related to a variety of computer virus known at the time, and a virus pattern related to a recently discovered new type of computer virus. For example, a virus pattern file delivered on Jul. 1, 2007 will cover all known computer viruses detected worldwide as on Jul. 1, 2007. In this case, it is clear that a file, for which a virus scan has already been executed using this virus pattern file, and which has not been updated subsequent to this virus scan, is not infected with a computer virus. By contrast, when a file, which has already been subjected to a virus scan using a certain virus pattern file, is updated subsequent to the creation date of that virus pattern file, there is the possibility that this file could be infected by a new type of computer virus, which emerged after this virus pattern file was created.

Thus, the guarantee information is information for guaranteeing a point in time up until which a file was not infected with a computer virus.

A virus scan configuration management table 370 manages information related to the configuration of a virus scan. The virus scan configuration management table 370, for example, correspondently manages a check-targeted difference volume number 371, a difference number 372, a scan scheduled time 373, a virus pattern file acquisition time 374, and processing options 375 and 376.

The check-targeted difference volume number 371 is information specifying the difference volume 240 targeted for a virus scan. The difference number 372, as explained hereinabove, is the difference number configured in this difference volume 240. The scan scheduled time 373 shows the scheduled date and time at which the virus scan will be implemented. The virus pattern file acquisition time 374 shows the date and time at which the virus pattern file utilized in the virus scan was acquired from the delivery server 40.

The first processing option 375 is information for selecting a method for restoring a file that has been infected with a computer virus. The file restore methods are automatic restore and manual restore. The second processing option 376 is information for selecting a method for deleting the computer virus-infected file (hereinafter may also be called an infected file). The infected file remove methods are automatic remove (file is automatically deleted) and manual remove (file is manually deleted).

FIG. 8 shows a virus scan execution result table 380. The virus scan execution result table 380 is for managing the results obtained from executing a virus scan. The virus scan execution result table 380, for example, correspondently manages a check-targeted difference volume number 381, a difference number 382, a scan time 383, a virus pattern file number 384, the presence or absence of an infection 385, and an infected filename 386.

Since the check-targeted difference volume number 381 and difference number 382 are as explained hereinabove, these explanations will be omitted. The scan time 383 shows the date and time at which the virus scan was implemented. The virus pattern file number 384 is information specifying the virus pattern file utilized in the virus scan. The presence or absence of an infection 385 is information showing whether or not a file has been infected with a computer virus. The infected filename 386 is information specifying a file that has been infected with a computer virus.

FIG. 9 is a schematic diagram showing a table 390 for managing the results of detecting a block corresponding to an infected file. This table 390, for example, correspondently manages a backup volume number 401, a difference volume number 402, a difference number 403, an infected filename 404, a block location 405, and processing option execution results 406 and 407.

Since the backup volume number 401, difference volume number 402, difference number 403, and infected filename 404 are as explained hereinabove, the explanations thereof will be omitted. The block location 405 is information specifying the block in which the data of a computer virus-infected file is stored.

The first processing option execution result 406 shows the results of executing file restore (file recovery), which is the first processing option. When an infected file is automatically restored, for example, the date and time of this restore, and the status of the restored file are recorded. When the file is restored manually, an entry to the effect that the restore was carried out manually is recorded.

The second processing option execution result 407 shows the results of executing a file remove (file deletion), which is the second processing option. When an infected file is automatically removed, for example, this remove date and time, and the result of the remove are recorded. When the infected file is removed manually, an entry to this effect is recorded.

Figure 10:
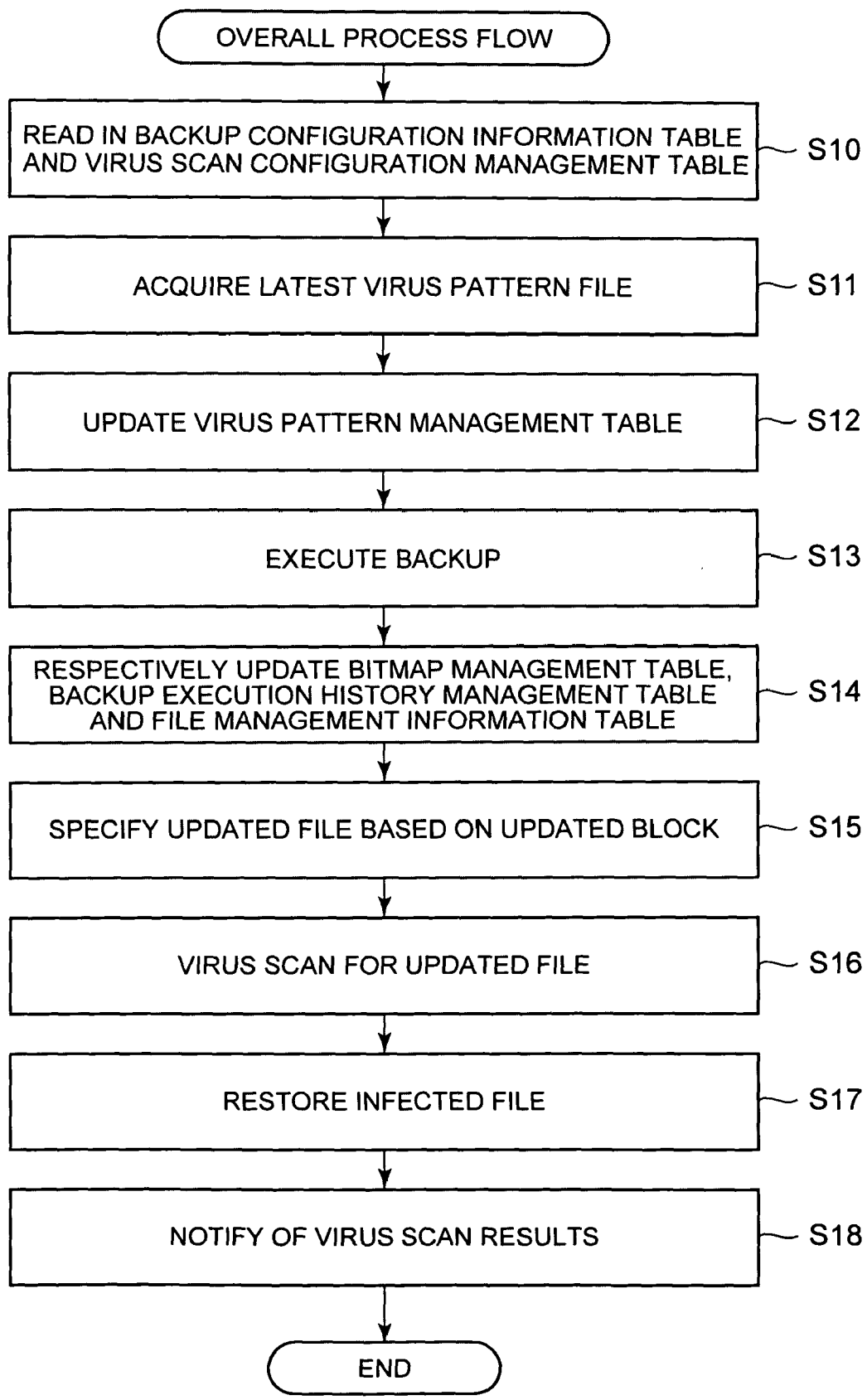
FIG. 10 is a flowchart showing the overall flow of processing.

The operation of the storage controller according to this embodiment will be explained based on FIGS. 10 through 19. FIG. 10 is a flowchart showing an overview of processing as a whole. Details of the respective steps shown in FIG. 10 will be explained hereinbelow together with the other figures. Hereinafter, the explanation will be presented using the controller 100 as the primary subject. Furthermore, the respective flowcharts explained hereinbelow schematically present outlines of the respective processes to the extent necessary to be able to understand and implement the present invention, and may differ from the actual computer programs. A person having ordinary skill in the art should be able to rearrange the order of the steps shown in the figures, and add new nonessential steps.

The controller 100 respectively reads in the backup configuration information table 300 and the virus scan configuration management table 370 from the management information volume 250 (S10), and acquires a new virus pattern file from the delivery server 40 (S11). Furthermore, the constitution can also be such that the controller 100 acquires a new virus pattern file in advance from the delivery server 40, and stores this acquired new virus pattern file in the storage device unit 200. Upon acquiring the new virus pattern file, the controller 100 updates the virus pattern management table 360 inside the management information volume 250 (S12). Details of the respective steps above will be explained below using FIG. 11.

Next, the controller 100 executes a backup based on the backup schedule (S13). Details of the backup process will be explained below using FIG. 12.

When the backup process ends, the controller 100 respectively updates the bitmap management table 320, the backup execution history management table 310, and the file management information table 340 (S14). The updates of the management tables 320, 310, 340 will be explained below using FIG. 13.

The controller 100 specifies the updated files on the basis of the updated blocks (S15). The specification results are recorded in table 350. The process for specifying the updated files will be explained below using FIG. 14.

The controller 100 implements a virus scan of the updated files using the new virus pattern file (S16). The virus scan will be explained below using FIG. 15.

When a computer virus-infected file is detected, the controller 100 restores the infected file (infected file recovery) (S17). The restore of the infected file will be explained below using FIGS. 16, 17 and 18.

Finally, the controller 100 notifies the pre-registered user of the virus scan execution results (S18). The user, for example, is the administrator of the storage controller 10. This information processing will be explained below using FIG. 19.

Figure 11:
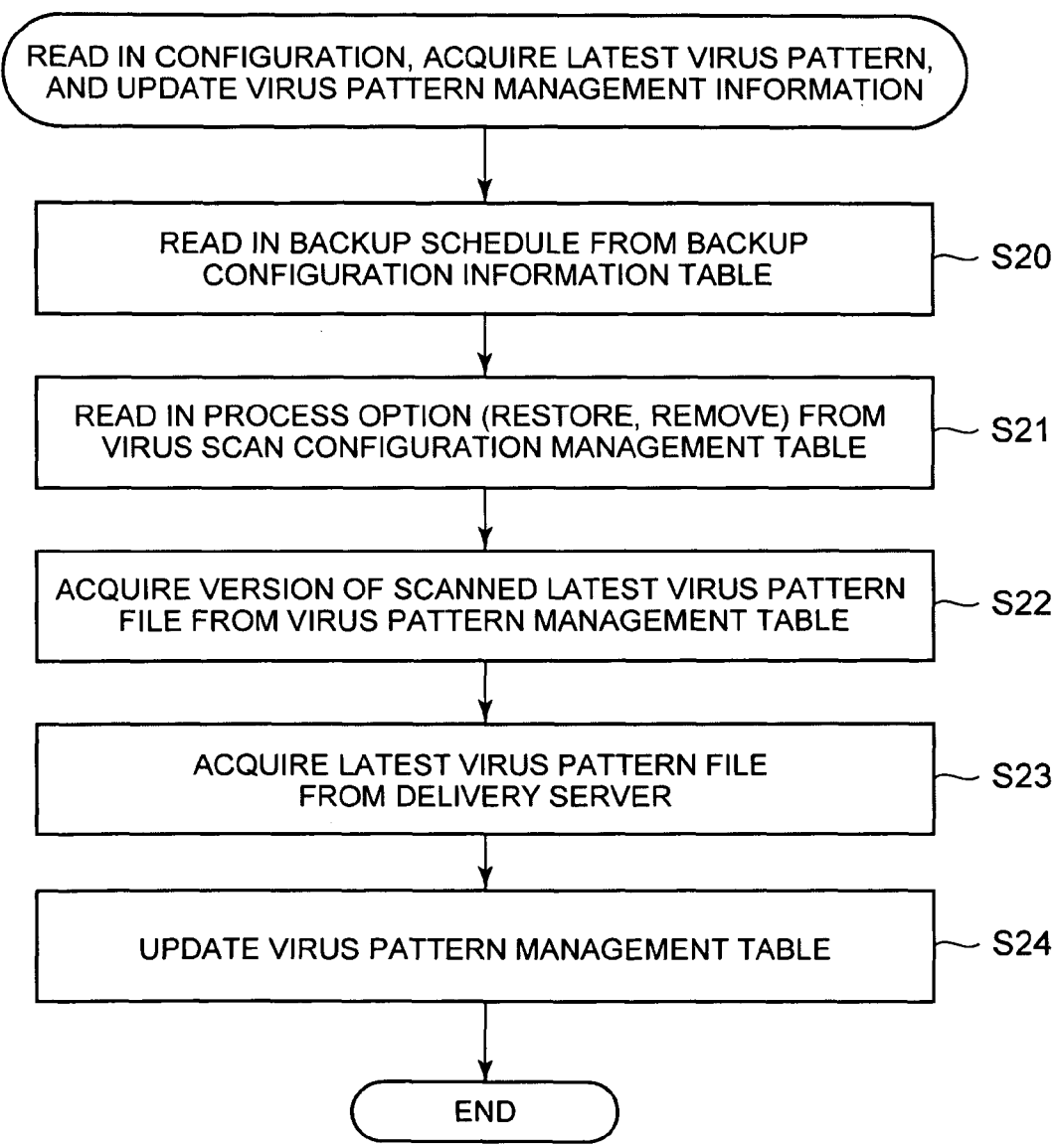
FIG. 11 is a flowchart showing the details of S10, S11 and S12 of FIG. 10.

FIG. 11 is a flowchart showing the details of S10 through S12 of FIG. 10. The controller 100 reads in the backup schedule configured in the backup configuration information table 300 (S20). The controller 100 reads in (either automatically or manually) the value configured in the processing option from the virus scan configuration management table 370 (S21), and also acquires from the virus pattern management table 360 the number of the latest virus pattern file via which a virus scan has been executed (S22).

The controller 100 accesses the delivery server 40, and downloads from the delivery server 40 a virus pattern file that is newer than the latest virus pattern file already used (S23). The controller 100 writes the information related to the latest virus pattern file acquired from the delivery server 40 to the virus pattern management table 360, updating the virus pattern management table 360 (S24).

Figure 12:
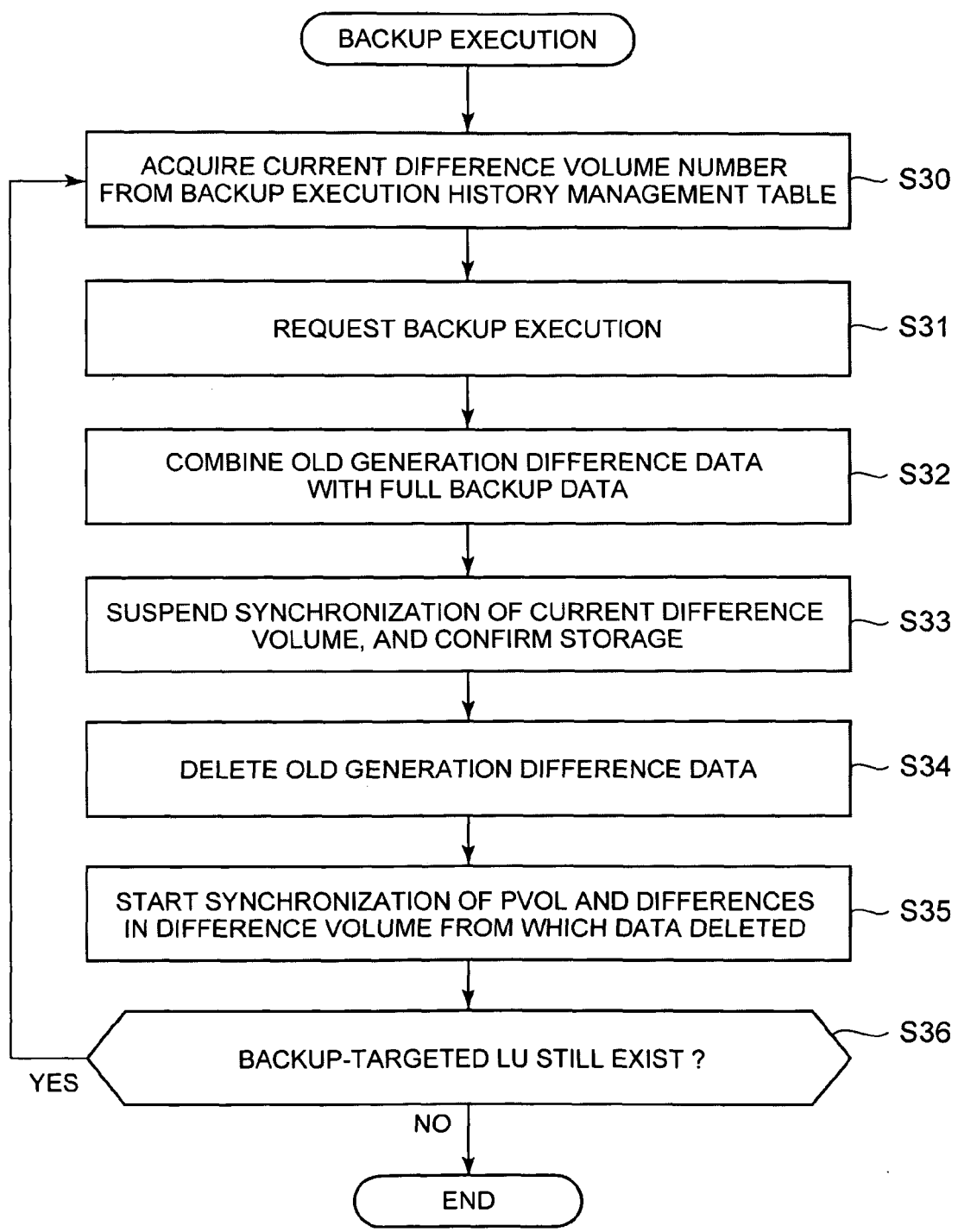
FIG. 12 is a flowchart showing the details of S13 of FIG. 10.

FIG. 12 is a flowchart showing the details of S13 of FIG. 10. The controller 100 acquires the number of the difference volume 240, which is managing the current difference data, from the backup execution history management table 310 (S30). The controller 100 requests the execution of a backup based on the backup schedule (S31), and combines the oldest generation differential backup data with the full backup data (S32). That is, in S32, the controller 100 advances the storage content of the backup volume 230 to the date and time of the oldest generation by writing the differential backup data stored in the oldest generation difference volume 240 to the backup volume 230. For example, when a differential backup is acquired every three hours, the storage content of the backup volume 230 is advanced by three hours in accordance with S32.

The controller 100 suspends difference data synchronization processing for the difference volume 240 managing the current difference data, and confirms the storage of the differential backup data stored in this difference volume 240 (S33).

The controller 100 deletes all of storage content of the difference volume 240, which stores the oldest generation differential backup data that was written to the backup volume 230 in S32 (S34). The controller 100 starts managing a new generation of differences by reusing the difference volume 240 from which the storage content was deleted (S35).

The controller 100 determines whether or not there still exists a volume (LU in the figure) for which a backup should be carried out (S36). The controller 100 repeatedly executes steps S30 through S35 until backup processing has ended for all the backup targets.

Figure 13:
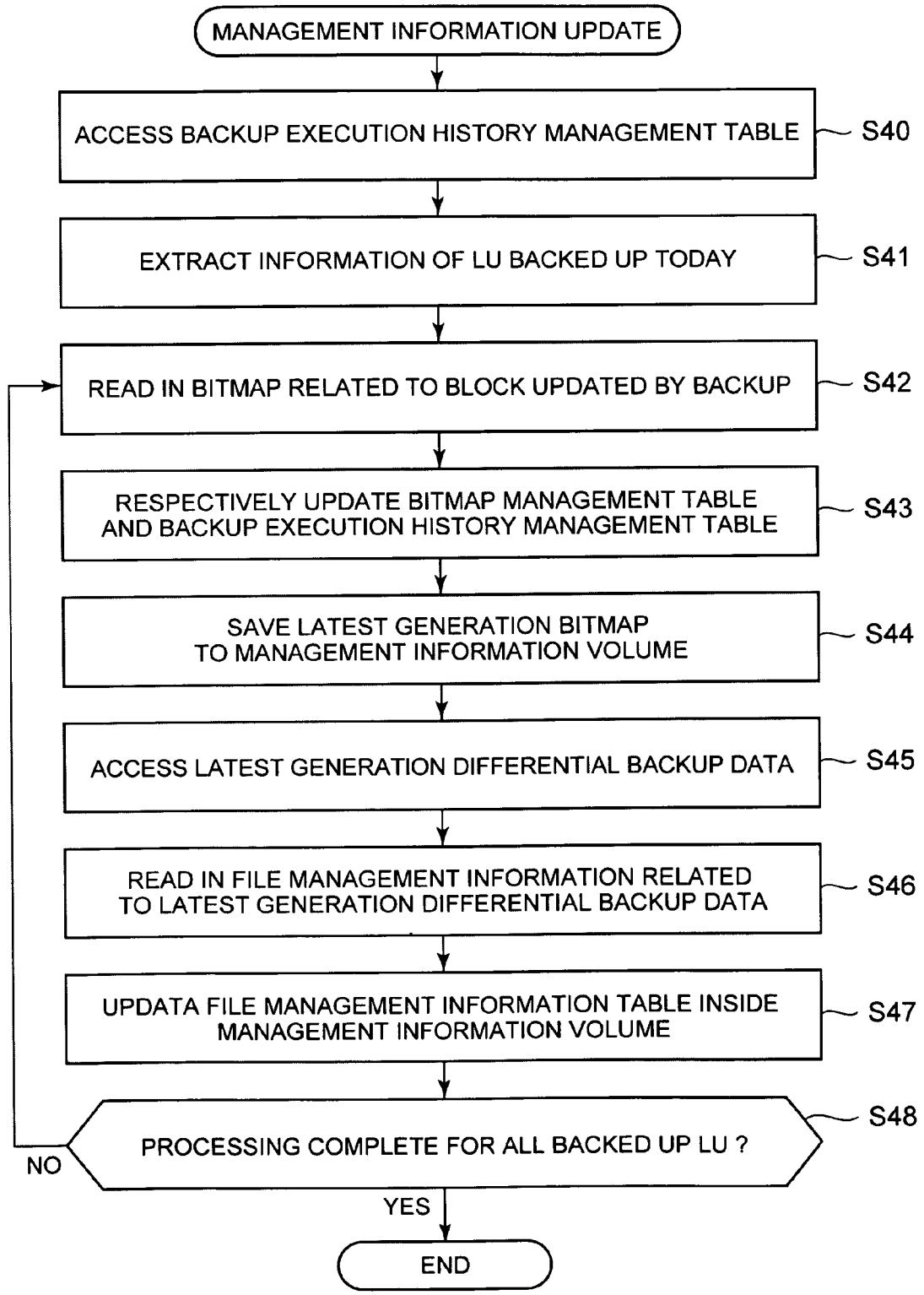
FIG. 13 is a flowchart showing the details of S14 of FIG. 10.

FIG. 13 is a flowchart showing the details of S14 of FIG. 10. The controller 100 accesses the backup execution history management table 310 (S40), and acquires information related to the volume, which was backed up that day (S41).

The controller 100 reads in the bitmap 330 related to the blocks that were updated by the backup (S42), and respectively updates the bitmap management table 320 and the backup execution history management table 310 (S43). That is, the controller 100 records information related to a backup completed that day in the respective tables 320, 310.

The controller 100 saves the bitmap 330 used in the backup completed that day to the management information volume 250 (S44). That is, the controller 100 stores in the management information volume 250 the bitmap related to the differential backup data, which until just previously was the current difference volume, and the storage of which was confirmed by the execution of the backup. That is, the controller 100 saves the bitmap, which has been made correspondent to the latest generation difference volume in the management information volume 250.

The controller 100 accesses the latest generation differential backup data (S45), and also reads in the file management information related to the latest generation differential backup data (S46), and consequently updates the file management information table 340 in the management information volume 250 (S47). The controller 100 repeatedly executes S42 through S47 until the processing for all the volumes backed up that day has ended (S48).

That is, in accordance with the processing shown in FIG. 13, the controller 100 stores information related to the latest generation differential backup to the respective tables that need to be updated.

Figure 14:
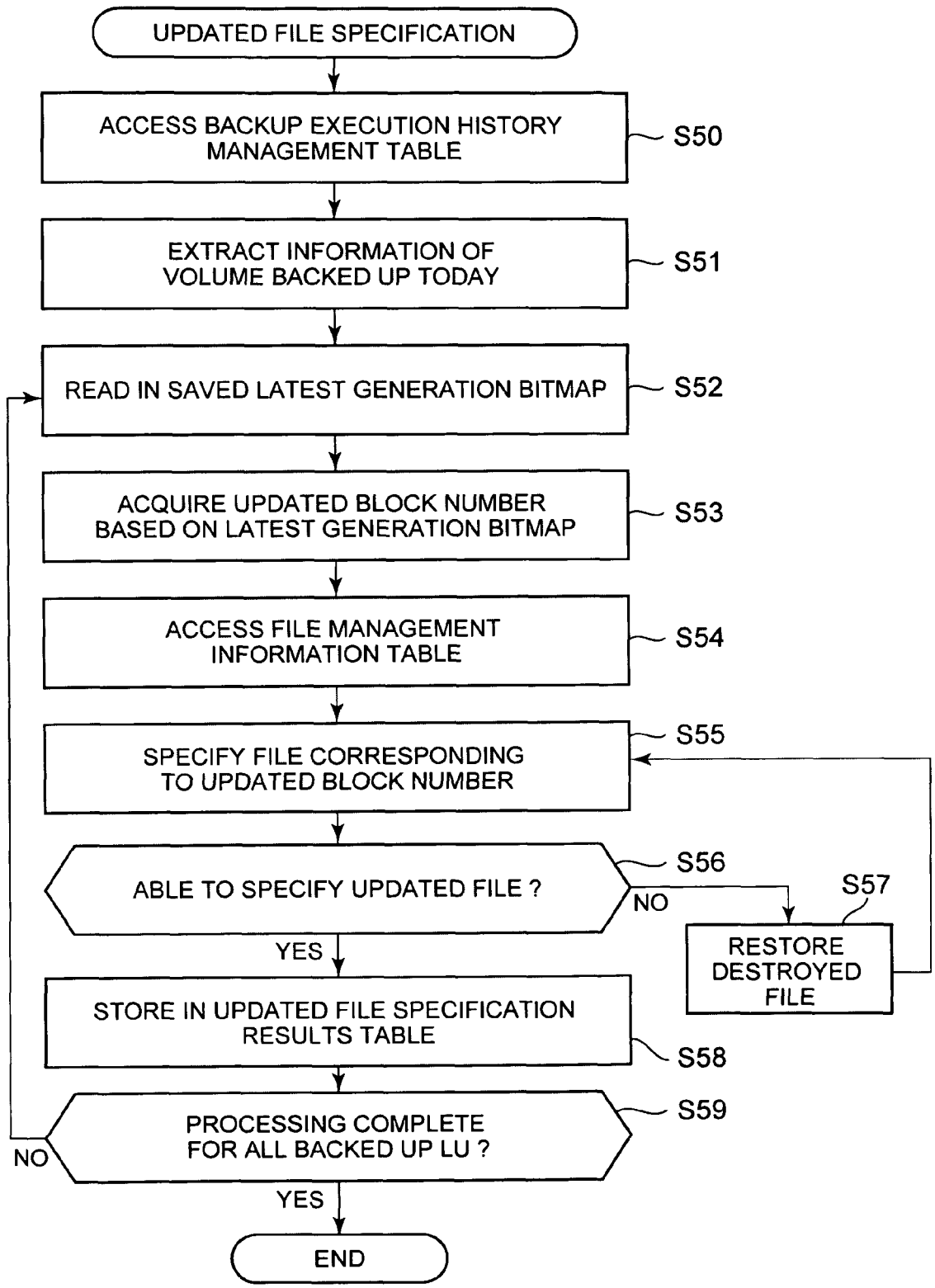
FIG. 14 is a flowchart showing the details of S15 of FIG. 10.

FIG. 14 is a flowchart showing the details of S15 of FIG. 10. The controller 100 accesses the backup execution history management table 310 (S50), and extracts information related to the volumes backed up that day (S51).

The controller 100 reads in, to the memory 130, the latest generation bitmap 330 saved to the management information volume 250 (S52), and acquires the numbers of the updated blocks from this latest generation bitmap 330 (S53).

The controller 100 accesses the file management information table 340 (S54), and specifies the file corresponding to the updated blocks (S55). The controller 100 determines whether or not the updated file corresponding to the updated blocks was able to be specified (S56). If the updated file could not be specified (S56: NO), there is the possibility that this file was destroyed. Accordingly, the controller 100 restores the destroyed file in accordance with a known procedure (S57), and returns to S55. For example, as a known procedure, it is possible to cite a restore method, which makes use of parity or the like, such as that known in RAID 5 and so forth.

When the updated file was able to be specified (S56: YES), the controller 100 stores information related to the specified updated file in table 350 shown in FIG. 6 (S58). The controller 100 repeatedly executes S52 through S58 until the processing of all the volumes backed up that day has been completed (S59).

Figure 15:
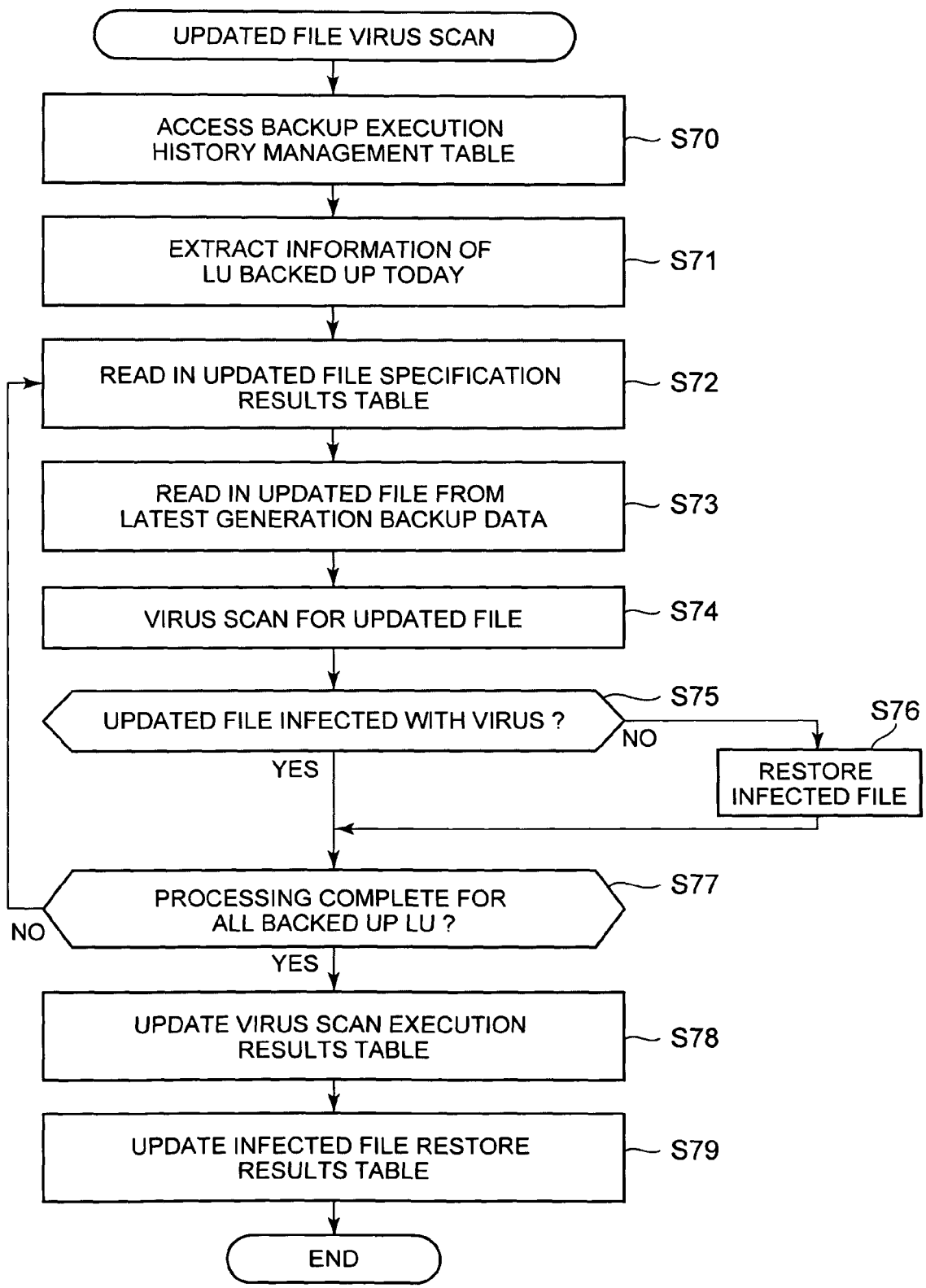
FIG. 15 is a flowchart showing the details of S16 of FIG. 10.

FIG. 15 is a flowchart showing the details of S16 of FIG. 10. The controller 100 accesses the backup execution history management table 310 (S70), and acquires information related to the volume backed up that day (S71).

The controller 100 reads in table 350, which shows the results of specifying the updated file corresponding to the updated blocks (S72), and reads the data of the updated file to the memory 130 from the latest generation backup data based on the storage content of this table 350 (S73).

The controller 100 uses the latest virus pattern file to execute a virus scan of the updated file read into the memory 130 (S74). The controller 100 determines whether or not the updated file is infected with a computer virus (S75).

When the updated file is infected with a computer virus (S75: NO), the controller 100 carries out an infected file restore process, which will be explained hereinbelow (S76). S76 is equivalent to S17 of FIG. 10.

When the updated file is not infected with a computer virus (S75: YES), the controller 100 determines whether or not the processing for all the volumes backed up that day has ended (S77). When there is an unprocessed volume (S77: NO), the controller returns to S72.

When the processing related to all the backed up volumes has ended (S77: YES), the controller 100 updates the virus scan execution results table 380 (S78), and also updates an infected file restore results table 400 (S79).

Figure 16:
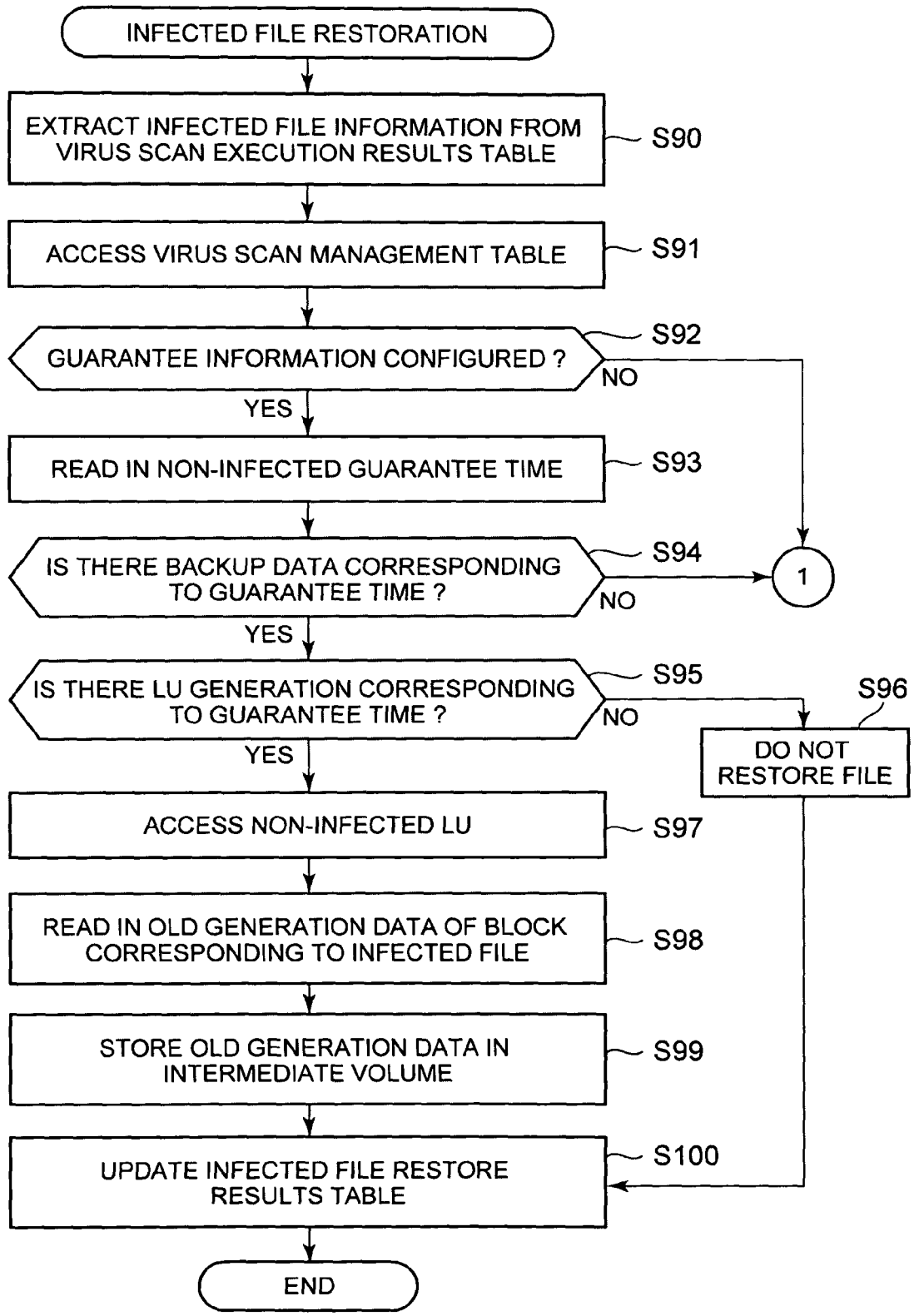
FIG. 16 is a flowchart showing the details of S17 of FIG. 10.
Figure 17:
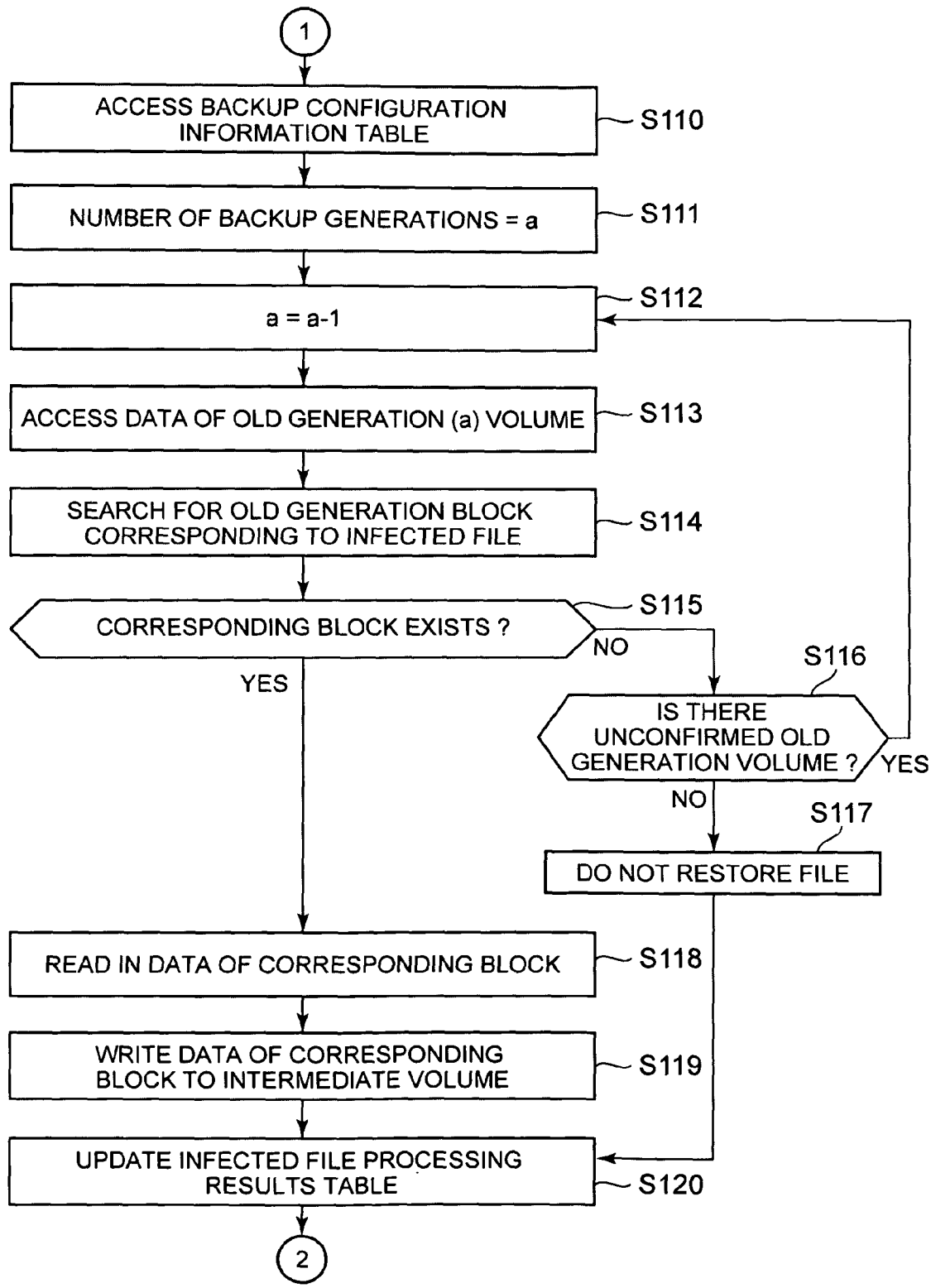
FIG. 17 is a continuation flowchart of FIG. 16.
Figure 18:
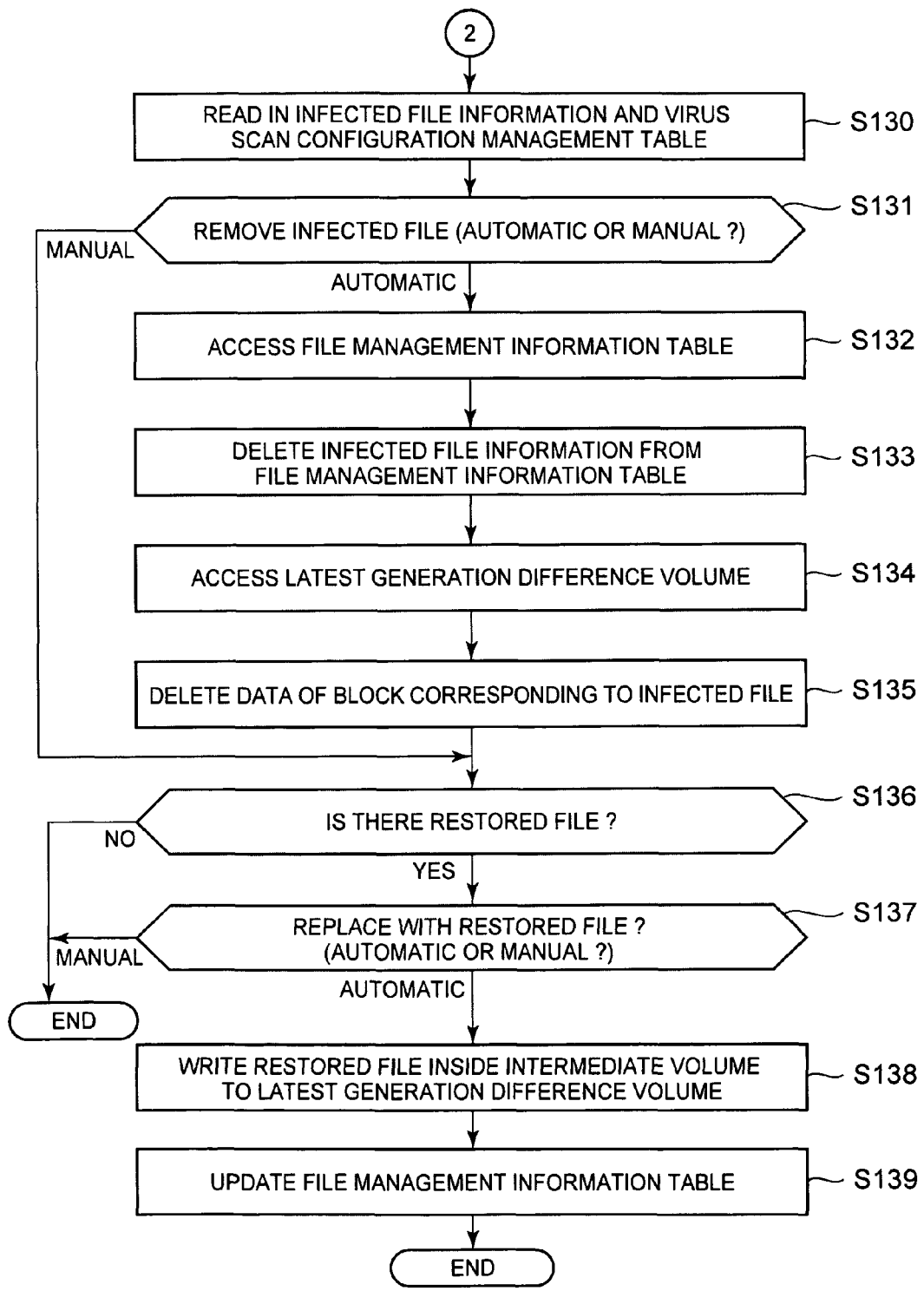
FIG. 18 is a continuation flowchart of FIG. 17.

FIGS. 16 through 18 are flowcharts showing the details of S17 of FIG. 10. The controller 100 restores a file that has been infected with a computer virus using any of a plurality of methods, which will be described hereinbelow. In a first method, the controller 100 restores an infected file by using the guarantee information configured in the virus pattern file to return the data to the point in time at which the previous virus scan ended (S92 through S100). In a second method, when it is not possible to make use of the guarantee information, the controller 100 detects pre-virus infection data by going back in order from the newer generation to the older generations, and uses the pre-virus infection data to restore the infected file (S110 through S120).

Returning to the explanation of FIG. 16, the controller 100 extracts information related to an infected file from the virus scan execution results table 380 (S90).

The controller 100 accesses the virus pattern management table 360 (S91), and determines whether or not guarantee information is configured in the virus pattern file that detected the virus infection (S92). When the virus pattern file does not have guarantee information (S92: NO), the controller 100 carries out a restore using the differential backup data of all the generations. The restore method, which utilizes this all-generation differential backup data will be explained hereinbelow.

When guarantee information has been configured (S92: YES), the controller 100 reads in the guarantee time, which shows the reference date guaranteeing that there is no virus infection (S93), and determines whether or not there exists differential backup data corresponding to the period during which non-virus infection is guaranteed (S94). When there is not corresponding differential backup data (S94: NO), a restore is carried out using the differential backup data of all the generations.

The controller 100 accesses the backup execution history management table 310, and determines whether or not there exists a difference volume 240 of a generation, which corresponds to the period during which non-virus infection is guaranteed (S95).

When there is no generation difference volume 240 corresponding to the period during which non-virus infection is guaranteed (S95: NO), a restore of the infected file cannot be carried out, and the controller 100 returns to S100 without restoring the infected file.

When there is a generation difference volume 240 corresponding to the period during which non-virus infection is guaranteed (S95: YES), the controller 100 accesses this difference volume 240 (S97), and reads in the old generation data of the blocks corresponding to the infected file (S98). That is, the controller 100 reads out the data of the infected file from the differential backup data of the generation not infected with the virus. Naturally, the generation not infected with the virus is a generation earlier than the latest generation for which a virus infection was detected.

The controller 100 reproduces the uninfected old generation differential backup data by writing this data to the intermediate volume 260 (S99). The data restored inside the intermediate volume 260 will be substituted for the infected file in accordance with the removal process described hereinbelow.

Finally, the controller 100 updates the infected file restore results table 400 (S100).

FIG. 17 is a flowchart showing the process for restoring an infected file using the differential backup data of all generations when guarantee information cannot be used.

The controller 100 accesses the backup configuration information table 300 (S110), subtracts 1 from the number of backup-acquired generations a (S111, S112), and decides the process-targeted generation. That is, since a virus infection has been detected for the backup data of the latest generation (a), the controller 100 uses backup data from the differential backup data of one generation prior (a−1) to the latest generation (a).

The controller 100 accesses the volume of the generation immediately prior to the latest generation (S113), and searches for the block corresponding to the infected file (S114). When it is not possible to detect the block corresponding to the infected file (S115: NO), the controller 100 determines whether or not there is an old generation difference volume that has yet to be confirmed (S116). If an unconfirmed difference volume exists (S116: YES), the controller 100 decrements the number of the generation targeted for this processing by 1 (S112), and repeats S113 through S115.

If the block corresponding to the infected file cannot be found even after checking all the generations of difference volumes (S116: NO), it is not possible to restore the infected file. Accordingly, the controller 100 moves to S120 without restoring the infected file.

That is, in S112 through S117, to find old data that corresponds to the infected file, the controller 100 checks the respective difference volumes one by one by going back in order from the new generation difference volume to the older generation difference volumes.

When an old generation block, which corresponds to the infected file, is detected (S115: YES), the controller 100 reads in the data of this old generation block (S118), writes the read-in data to the intermediate volume 260 (S119), and restores the file. The controller 100 updates the infected file restore results table 400 (S120).

FIG. 18 is a flowchart showing the infected file remove process. The controller 100 reads in information related to the infected file, and the virus scan configuration management table 370 (S130), and determines whether the infected file remove method has been configured to automatic or to manual (S131). If the infected file remove method is configured to manual, the controller 100 skips S132 through S135, and moves to S136.

When the infected file remove method is configured to automatic, the controller 100 access the file management information table 340 (S132), and deletes information related to the infected file from this table 340 (S133).

Next, the controller 100 accesses the latest generation difference volume 240 (S134), and deletes the data of the block corresponding to the infected file from this difference volume 240 (S135).

That is, when the infected file is removed automatically, the controller 100 deletes the record related to the remove-targeted infected file from table 340, and also deletes the infected file data from inside the latest generation difference volume 240 in which the infected file was found.

Next, the controller 100 determines whether or not a restored file exists inside the intermediate volume 260 (S136). When a restored file does not exist (S136: NO), this processing ends.

When a restored file exists (S136: YES), the controller 100 determines whether or not to automatically replace the infected file with the restored file (S137). When the infected file is to be replaced with the restored file manually, this processing ends. When the infected file is to be automatically replaced by the restored file, the controller 100 writes the data in the restored file inside the intermediate volume 260 to the latest generation difference volume 240 (S138). The controller 100 updates the file management information table 340, and ends this processing (S139).

Figure 19:
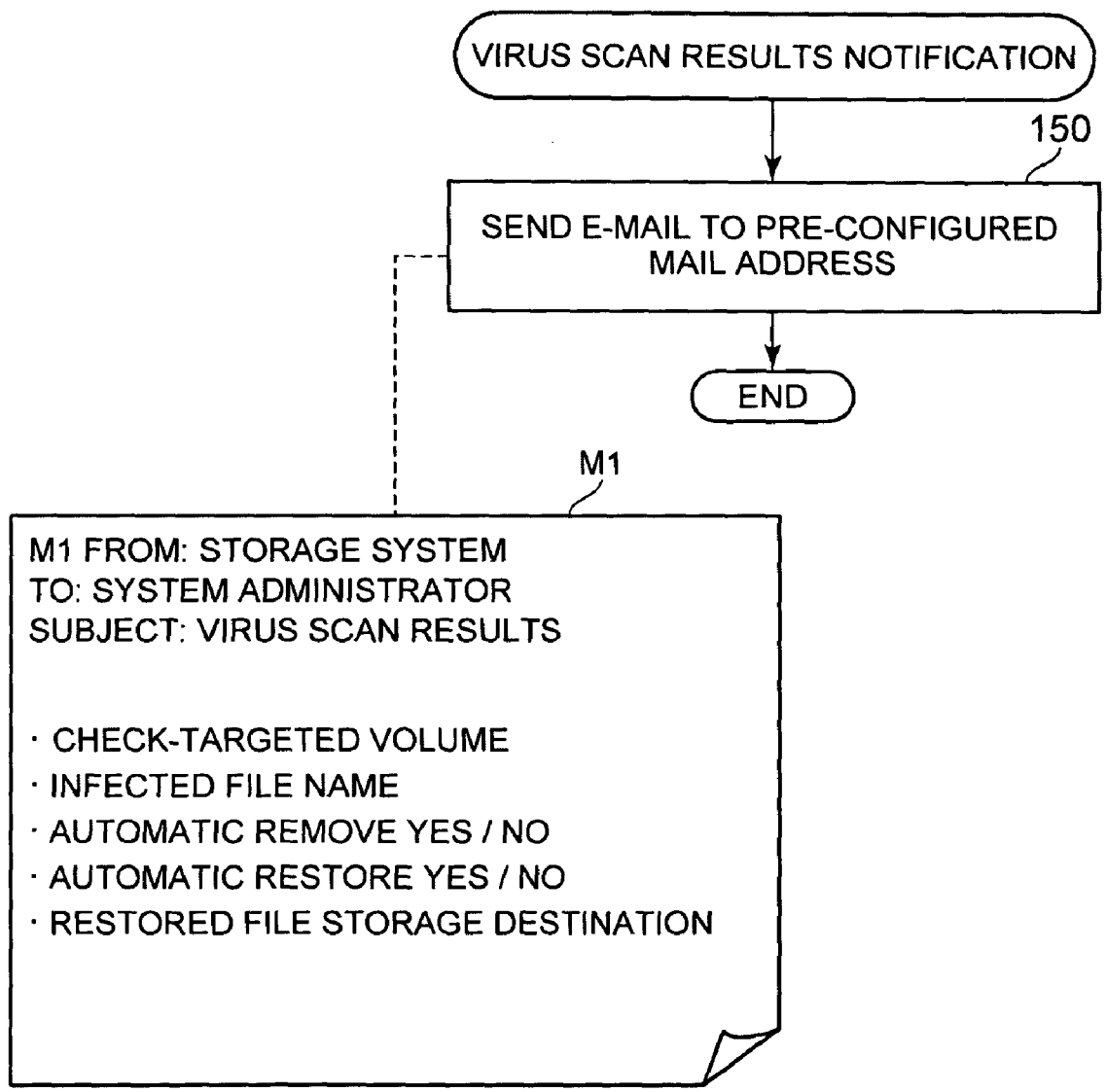
FIG. 19 is a flowchart showing the details of S18 of FIG. 10.

FIG. 19 is a flowchart showing the details of S18 of FIG. 10. The controller 100 sends an e-mail M1 showing the results of the virus scan to the pre-registered user (S150). This e-mail M1, for example, can comprise the number of the volume in which the infected file was found, the name of the infected file, the results of automatic restore and automatic remove, or an expression of a manual restore wait state or manual remove wait state, and the restored file storage destination address.

This embodiment, which is constituted in this way, provides the following effects. In this embodiment, an updated file corresponding to an updated block is detected using backup control, which manages a plurality of generations of differential backups, and only the updated file is checked using the latest virus pattern file. Therefore, a virus scan can be carried out more efficiently and in a shorter time than when a virus scan is performed for the entire backup volume. Further, since the virus scan is carried out inside the storage controller, it is possible to prevent an increase in the load placed on the host, and it is possible to prevent an increase in traffic over the communication network connecting the host and the controller 100. That is, in this embodiment, a virus scan can be carried out efficiently by linking this scan to differential backup control.

In this embodiment, when the differential backup save is confirmed, an updated file is detected based on the updated block included in the latest generation difference volume thereof, and a virus scan is executed for this updated file. Therefore, differential backup control and a virus scan process for an updated file can be separated, and executed independently.

In this embodiment, it is possible to restore the storage content of a file that has been infected with a computer virus by using one of two types of pre-configured methods. Therefore, it is possible to restore an infected file without increasing the load on the host, thereby enhancing usability for the user.

The first method uses guarantee information configured in the virus pattern file to return data to the point in time when the previous virus scan ended. The second method detects old data of prior to the virus infection by tracing back the differential backup data of respective generations. Therefore, when the first method can be used, it is possible to shorten the time required for file restoration, and when the first method cannot be used, it is still possible to try to restore a file.

[Second Embodiment]

A second embodiment will be explained by referring to FIGS. 20 and 21. The following embodiments, to include this embodiment, correspond to variations of the first embodiment. Explanations that duplicate those provided for the first embodiment will be omitted below. In this embodiment, the differential backup mechanism is used in the search process as well.

Figure 20:
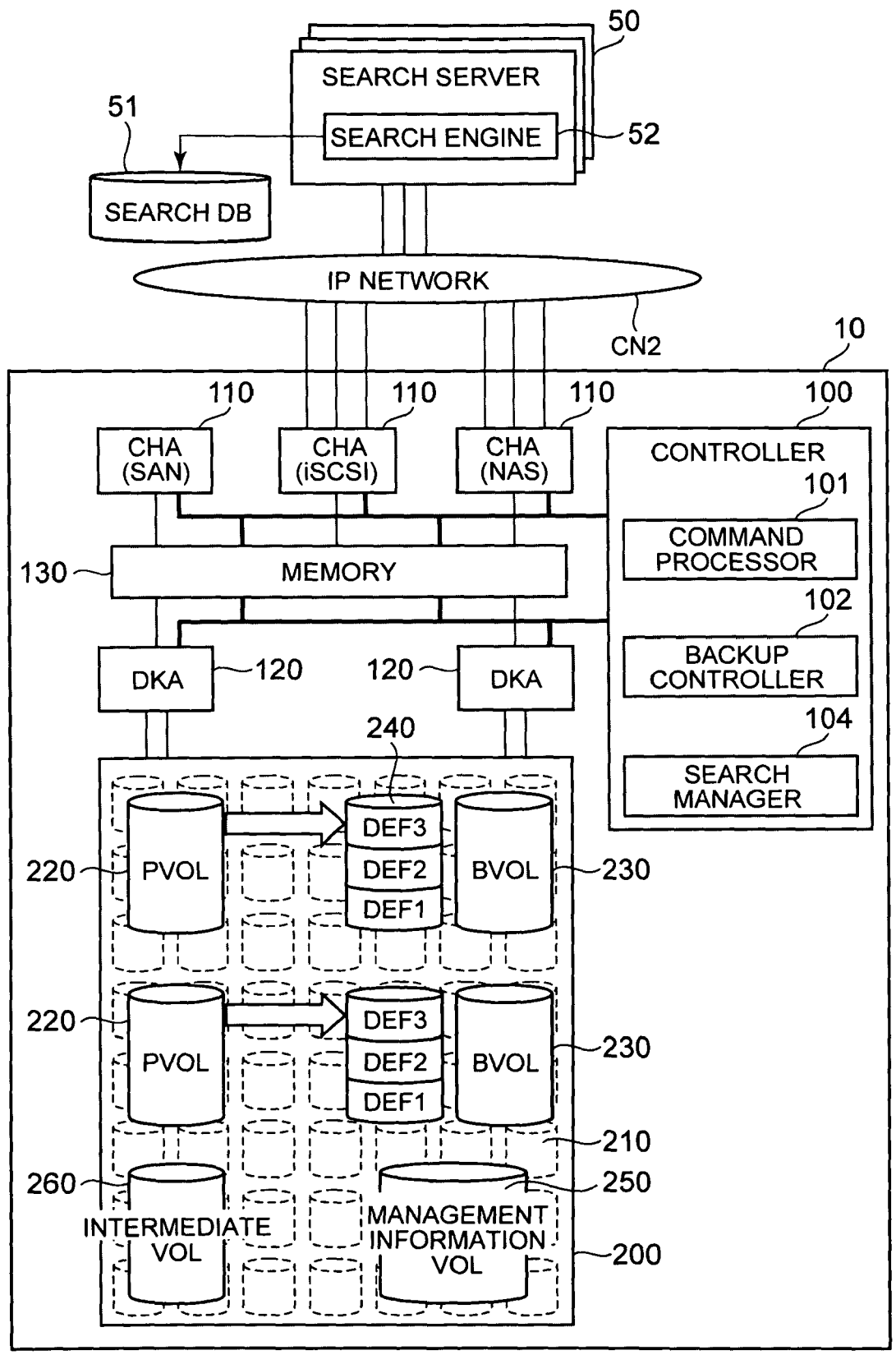
FIG. 20 is a block diagram of a storage system related to a second embodiment.

FIG. 20 is a block diagram of a system according to this embodiment. For convenience of explanation, the servers 20 and client PCs 30 will be omitted. Instead, a search server 50 is presented in this embodiment.

The search server 50, for example, comprises a search database 51 and a search engine 52. The search database 51 stores search information, which is used to search for a group of files stored inside the storage controller 10. Search information, for example, can include filename, file path, file size, creation date/time, update date/time, access frequency, creator, file type, keyword, text summary, and an image index. Furthermore, textual data inside a file can also be used as search information in preparation for full-text searches.

The search engine 52 searches inside the search database 51 on the basis of a search condition inputted from a client, and detects a file that matches the search condition.

Focusing on the storage controller 10 of this embodiment, the controller 100 comprises a search manager 104 instead of a virus scanner 103. The search manager 104 creates search information and sends this information to the search server 50 only for an updated file that corresponds to an updated block, the same as described in the first embodiment.

Figure 21:
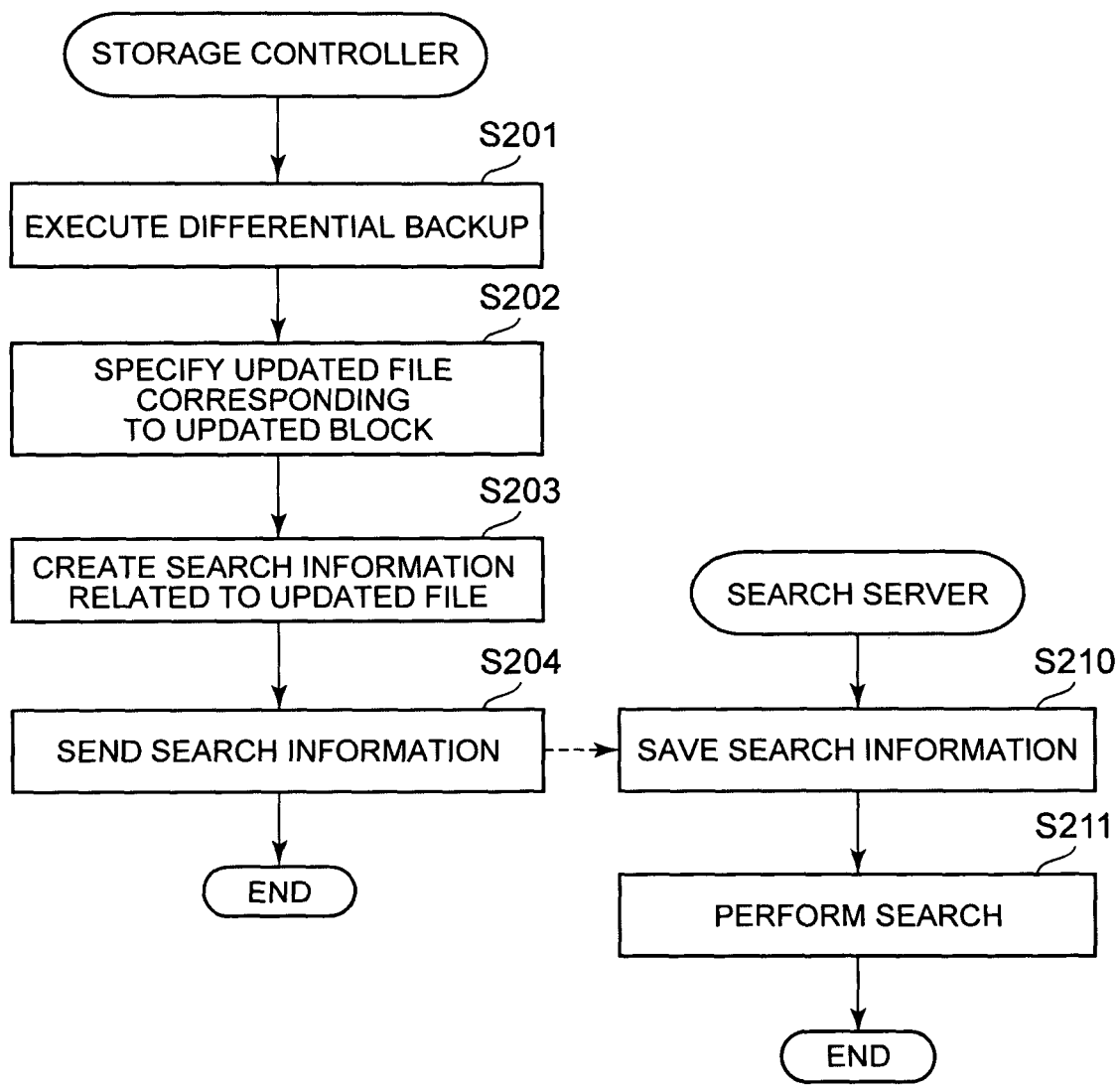
FIG. 21 is a flowchart showing an overview of operations.

FIG. 21 is a flowchart showing the operation of this embodiment. The backup controller 102 executes a differential backup for each generation (S201). When an updated file corresponding to an updated block is specified in the backup of the latest generation (S202), the search manager 104 creates search information related to the updated file (S203), and sends the search information to the search server 50 (S204).

The search server 50 receives the search information from the storage controller 10, and saves this information to the search database 51 (S210). Thereafter, upon receiving a search request from a client, the search server 50 uses the search database 51 in which the latest search information is stored to carry out a search (S211).

In this embodiment, which is constituted in this way, the differential backup control mechanism can be used to create search information only for a file corresponding to an updated block. Therefore, search information can be created efficiently without placing a load on the search server 50.

[Third Embodiment]

Figure 22:
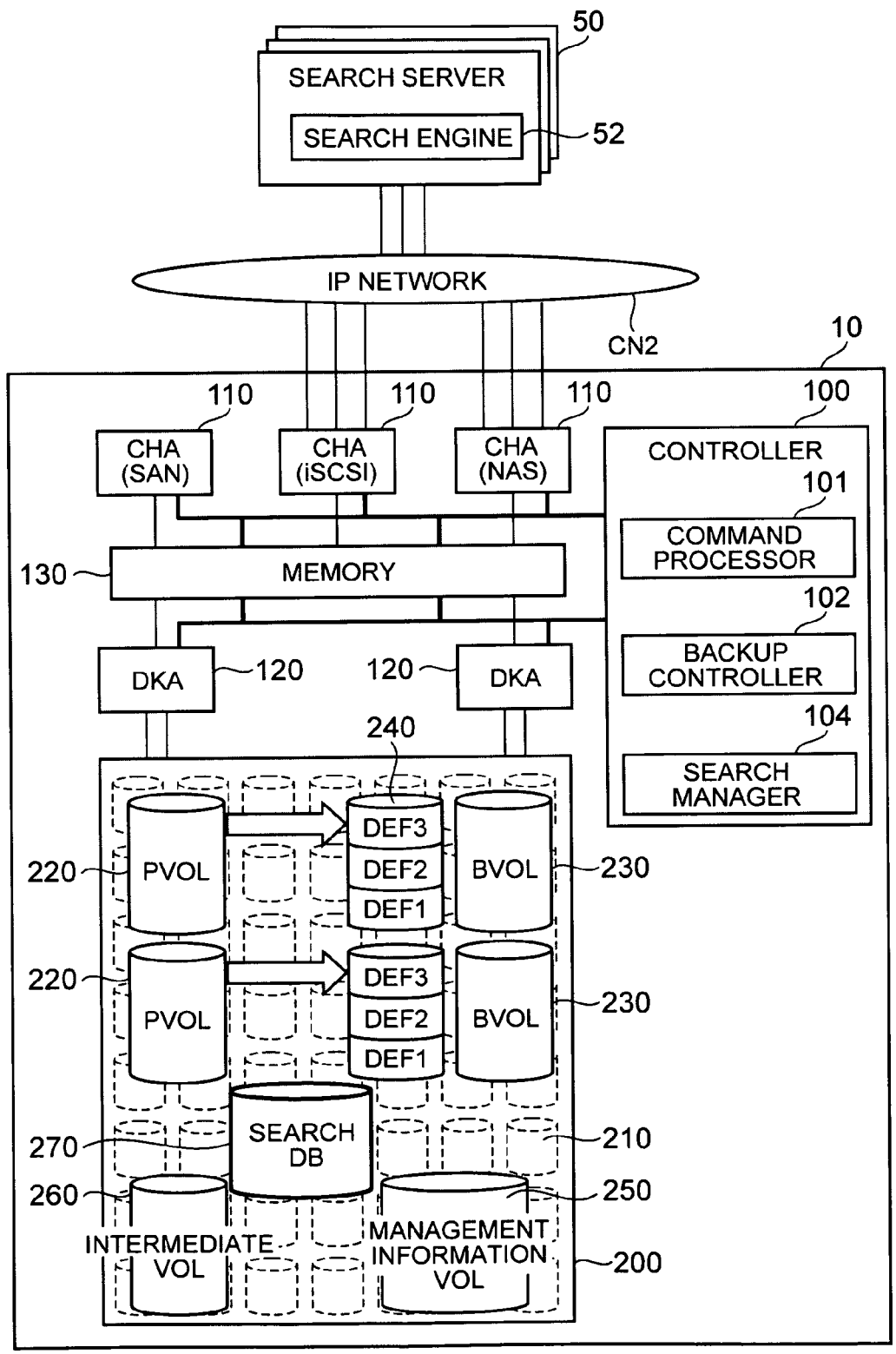
FIG. 22 is a block diagram of a storage system related to a third embodiment.

A third embodiment will be explained by referring to FIGS. 22 and 23. In this embodiment, a search database 270 is provided inside the storage controller 10. FIG. 22 is a schematic diagram of a system according to this embodiment.

Figure 23:
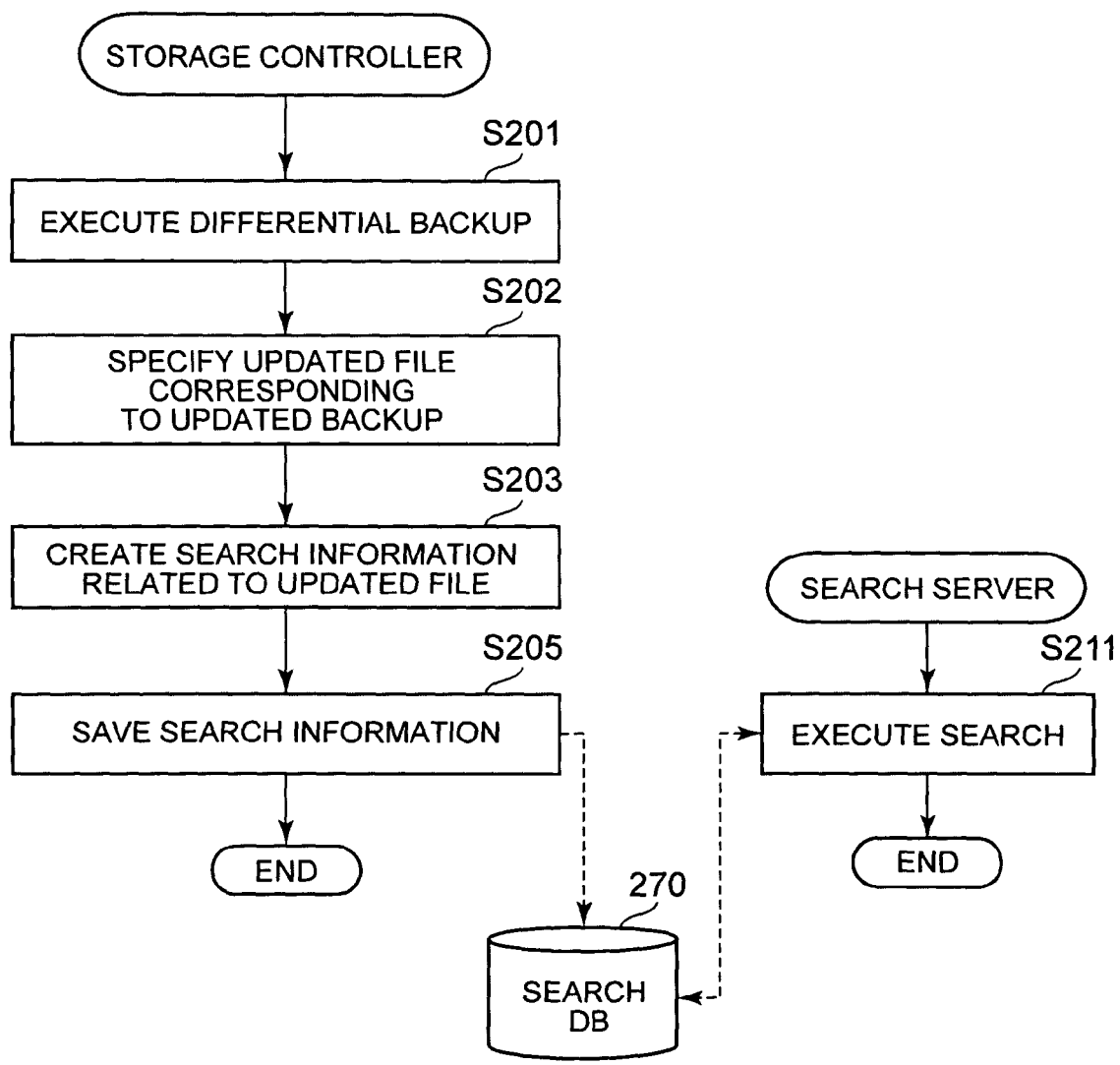
FIG. 23 is a flowchart showing an overview of operations.

FIG. 23 is a flowchart showing the operation according to this embodiment. The controller 100, subsequent to carrying out a differential backup (S201), specifies a file corresponding to an updated block (S202), and creates search information related to the updated file (S203). The search information is stored in the search database 270 inside the storage controller 10 (S205). This embodiment, which is constituted in this way, provides the same effects as the above-mentioned second embodiment.

[Fourth Embodiment]

A fourth embodiment will be explained by referring to FIGS. 24 and 25. In this embodiment, the differential backup mechanism is used in both a virus scan and the creation of search information. Further, in this embodiment, a search engine 105 is provided inside the controller 100.

Figure 24:
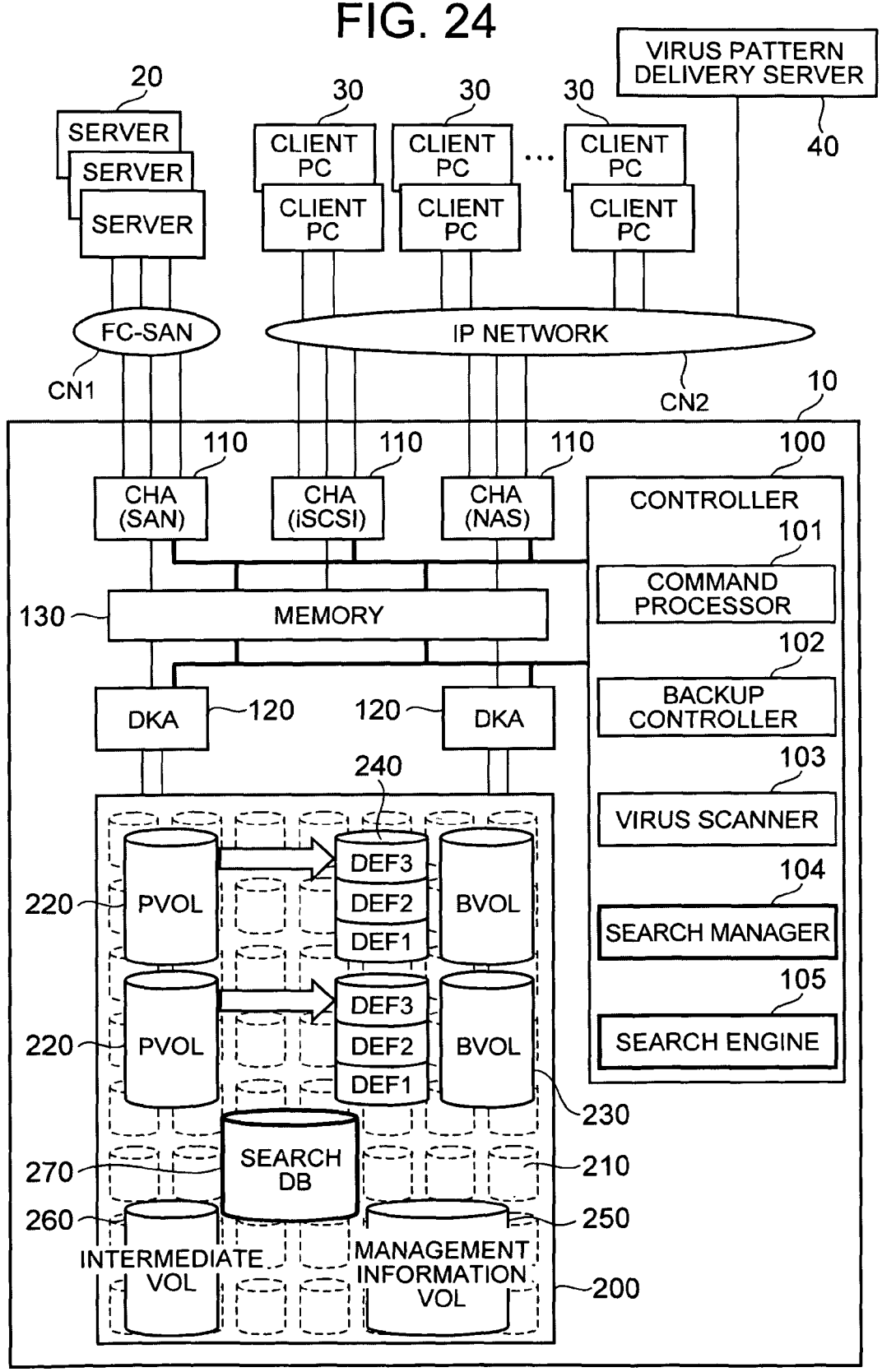
FIG. 24 is a block diagram of a storage system related to a fourth embodiment.

FIG. 24 is a block diagram of a system according to this embodiment. In addition to a command processor 101, a backup controller 102, and a virus scanner 103, the controller 100 is also provided with an information manager 104 and a search engine 105.

Figure 25:
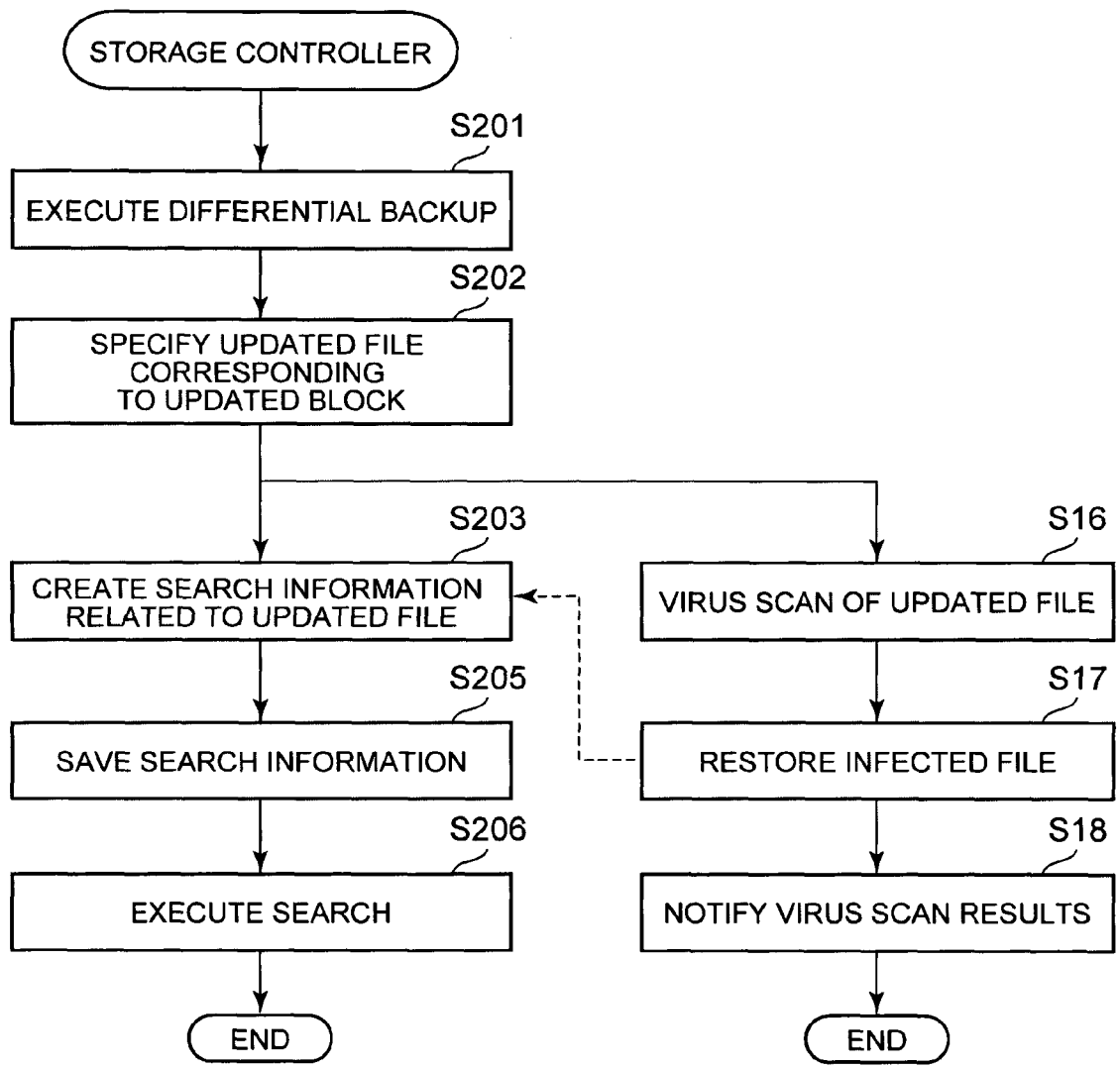
FIG. 25 is a flowchart showing an overview of operations.

FIG. 25 is a flowchart showing the operation of this embodiment. The controller 100, subsequent to carrying out a differential backup (S201), specifies an update file corresponding to an updated block (S202).

Thereafter, processes for creating and saving search information (S203, S205, S206) and virus scan-related processes (S16, S17, S18) are executed in parallel for the updated file.

Furthermore, when an infected file is restored (S17), the results of this restore are reflected in the creation of search information (S203). That is, when the infected file is restored, new search information is created on the basis of the restored content (S203).

This embodiment, which is constituted in this way, provides the same effects as those described in the above-mentioned respective embodiments. Furthermore, in this embodiment, the table 350 for managing updated files is used together with the virus scan-related processes and the search-related processes, and these respective processes are carried out in parallel. Therefore, the computer resources of the storage controller 10 (the storage device unit 200, memory 130, microprocessor of the controller 100, and so forth) can be utilized efficiently, and a plurality of processes can be executed simultaneously, thereby making it possible to enhance usability for the user.

[Fifth Embodiment]

A fifth embodiment will be explained by referring to FIGS. 26 and 27. In this embodiment, the creation of search information, and the saving and retrieving of search information is divided between respectively different storage controllers 10A, 10B.

Figure 26:
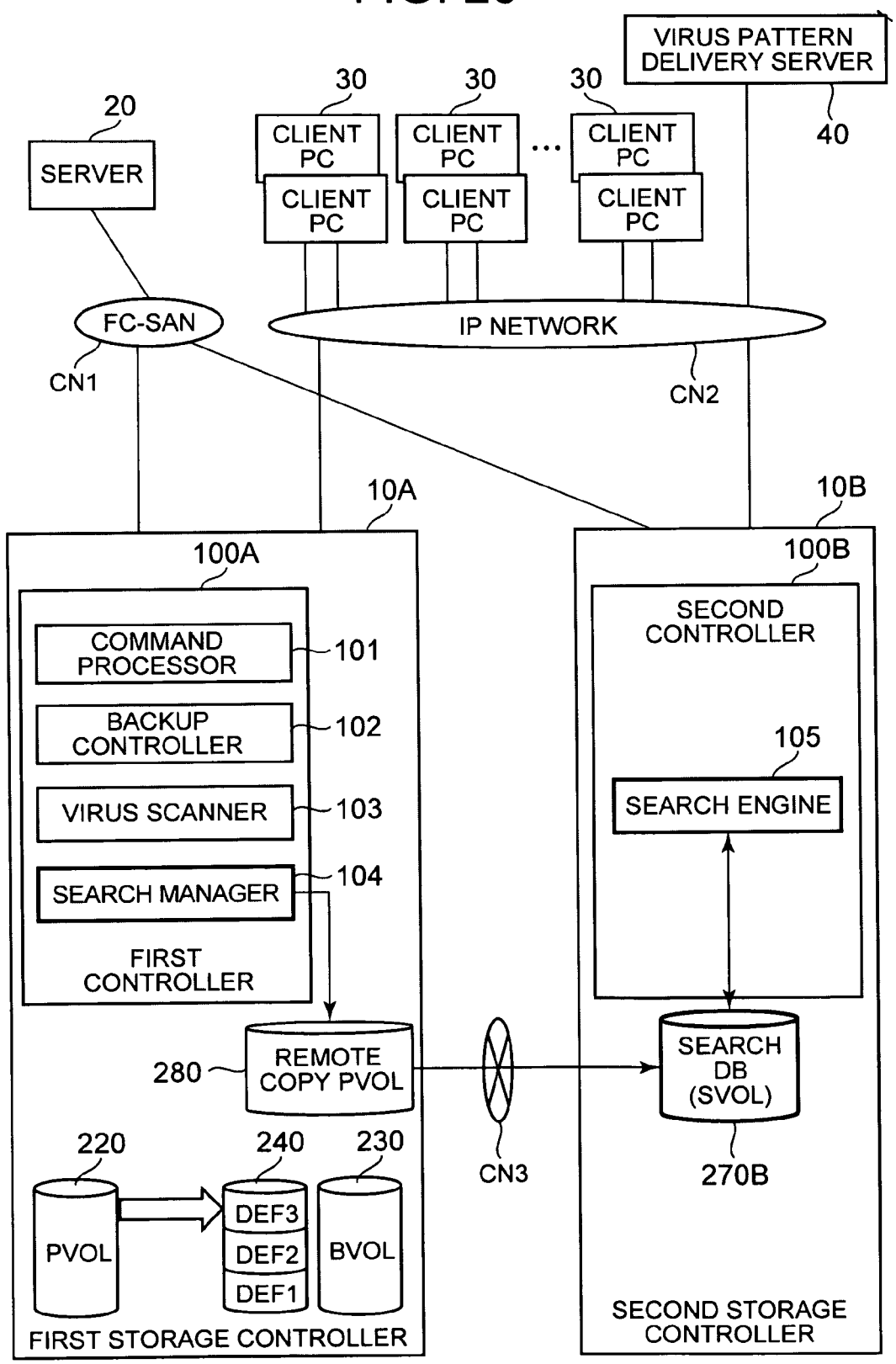
FIG. 26 is a block diagram of a storage system related to a fifth embodiment.

FIG. 26 is a block diagram of a system according to this embodiment. The system of this embodiment comprises a first storage controller 10A and a second storage controller 10B. The first controller 100A of the first storage controller 10A comprises a command processor 101, a backup controller 102, a virus scanner 103, and a search manager 104. That is, the first storage controller 10A is in charge of controlling a differential backup, carrying out a virus scan and restoring an infected file, and creating search information (104).

Furthermore, the first storage controller 10A comprises a primary volume 280 for remote copy use. This remote copy-source volume 280 stores search information created by the search manager 104. The remote copy-source volume 280, for example, is connected to a search database 270B inside the second storage controller 10B via a remote copy communication network CN 3, such as a SAN. This search database 270B is the remote copy-destination volume.

The second controller 100B of the second storage controller 10B comprises a search engine 105. The search engine 105 detects a file matching a search condition by searching the search database 270B inside the second storage controller 10B.

Figure 27:
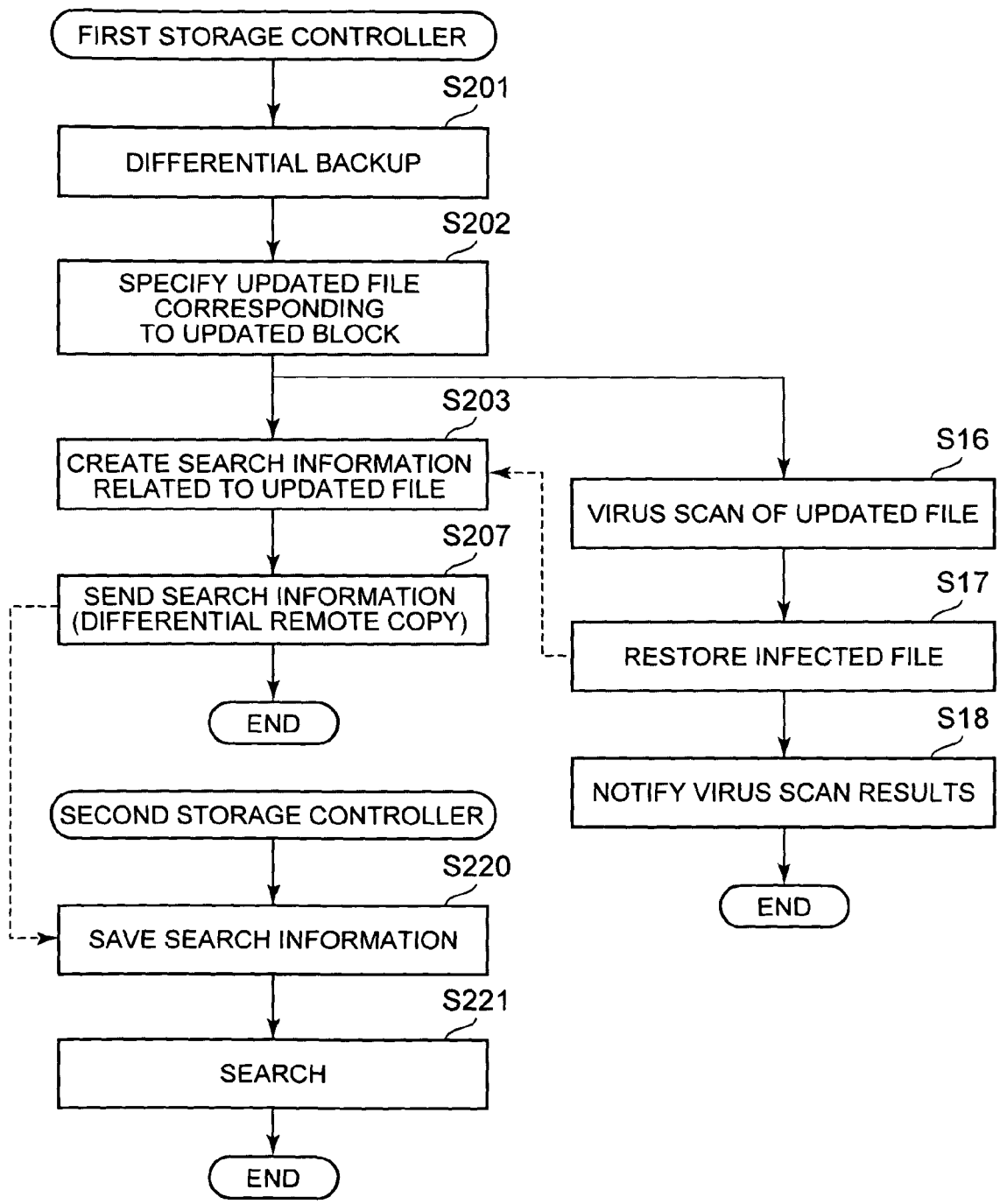
FIG. 27 is a flowchart showing an overview of operations.

FIG. 27 is a flowchart showing the operation according to this embodiment. The first controller 100A, subsequent to carrying out a differential backup (S201), detects an updated file corresponding to an updated block (S202). The first controller 100A implements a virus scan only for the updated file (S16), restores an infected file (S17) and communicates the results of the virus scan to the user (S18).

Further, the first controller 100A creates search information for the updated file (S203). The updated file-related search information is stored in the remote copy-source volume 280, and is sent from the remote copy-source volume 280 to the search database 270B, which is the remote copy-destination volume (S207).

A differential remote copy technique is used to send the search information. That is, only the difference data (latest search information) generated between the remote copy-source volume 280 and the remote copy-destination volume 270B is sent from the first storage controller 10A to the second storage controller 10B (S207). The second controller 100B stores the search information received from the first storage controller 10A in the search database 270B, which is the remote copy-destination volume (S220). The second controller 100B searches the search database 270B in accordance with a search condition from a client PC 30 (S221).

This embodiment, which is constituted in this way, also achieves the same effects as the above-mentioned embodiments. Furthermore, in this embodiment, the virus scan-related processes and search information creation-related processes make joint use of the updated file, these respective processes are executed, and the search information is remote copied to the search database 270B inside the other storage controller 10B.

Therefore, in this embodiment, it is possible to divide the roles between the respective storage controllers 10A and 10B, making it possible to reduce the load on the first storage controller 10A more than when the search engine 105 is provided inside the first storage controller 10A.

Furthermore, in this embodiment, newly created search information is sent to the remote copy destination using the remote copy communication network CN 3, which is separate from the communication networks CN 1, CN 2 for I/O (Input/Output) use. Therefore, the latest status can be maintained by linking the search information to a differential backup without increasing the load placed on the host.

Furthermore, the present invention is not limited to the embodiments described hereinabove. A person having ordinary skill in the art can make various additions and changes without departing from the scope of the present invention.

What is claimed is:

1. A storage controller, which provides a primary volume to a host computer, comprising:
  a backup controller performing a differential backup, including:
    a first backup data which is data of the primary volume at a first point in time;
    a second backup data which is data of the primary volume at a second point in time; and
    a third backup data which is data of the primary volume at a third point in time;

an updated-file detector for detecting files updated by the host computer after a previous virus scan process on the primary volume;

a virus scanner which carries out a virus scan process for checking whether or not each of the detected updated files is infected with a computer virus; and a file restorer for restoring at least one file data in the primary volume with one of the backup data provided by the backup controller if the virus scanner determined the at least one file in the primary volume as an infected file, wherein the backup controller is configured to detect an updated block of the primary volume generated as a result of a file update request from the host computer;

wherein the backup controller is configured to manage:
the first backup data to be stored in the backup volume for providing the first backup data;

a first difference bitmap and a first difference data for providing the second backup data, wherein the first difference bitmap shows first updated blocks of the primary volume as result of a file update request from the host computer between the first point in time and the second point in time, the first difference data is data of the first updated blocks and to be stored in a difference volume; and a second difference bitmap and a second difference data for providing the third backup data, the second difference bitmap shows second updated blocks in the primary volume as result of a file update request from the host computer between the second point in time and the third point in time, the second difference data is data of the second updated blocks and to be stored in the difference volume, wherein, when the virus scanner carries out the virus scan process after the third point in time for files updated between the second point in time and third point in time, the updated-file detector identifies the second updated blocks, which are updated as a result of a file update request from the host computer between the second point in time and the third point in time based on the second bitmap and detects the files updated between the second point in time and the third point in time by detecting the files including the identified second updated blocks, the virus scanner carries out the virus scan process for checking whether or not the each of the detected updated files is infected with a computer virus, wherein if the virus scanner determined the at least one detected file as an infected file after a third point in time among the files updated between the second point in time and third point in time, the file restorer restores the data of the infected at least one file with the second backup data provided by the backup controller.

2. The storage controller according to claim 1, wherein the updated-file detector detects an updated file in differential backup data, which has been confirmed as being saved by the backup controller.

3. The storage controller according to claim 2, wherein the virus scanner checks each updated file using a virus pattern file delivered subsequent to the previous check.

4. The storage controller according to claim 2, further comprising:
a data processor, which executes a data process for each updated file detected by the updated-file detector.

5. The storage controller according to claim 1, wherein the virus scanner checks the updated file using a virus pattern file delivered subsequent to the previous virus scan process.

6. The storage controller according to claim 5, wherein the file restorer restores a storage content of the infected at least one file to a state where the at least one file is not infected with the computer virus using either one of a pre-configured first restore method or second restore method.

7. The storage controller according to claim 6, wherein the virus pattern file includes guarantee time information, which guarantees a time period during which there is no infection by any computer virus included in this virus pattern file, and the first restore method restores the storage content of the infected at least one file to a state where the at least one file is not infected with the computer virus, by using the data in a block corresponding to the infected at least one file, which is included in the differential backup data corresponding to the time period specified in the guarantee time information.

8. The storage controller according to claim 6, wherein the second restore method detects a block corresponding to the infected at least one file by tracing back differential backup data of past generations in order from the differential backup data of one generation older than the latest generation, and restores the storage content of the infected at least one file to a state where the at least one file is not infected with the computer virus by using the data in this detected block.

9. The storage controller according to claim 1, further comprising:
a data processor, which executes a data process for each updated file detected by the updated-file detector.

10. The storage controller according to claim 9, wherein the data process is a process for creating search information to be used in a file search.

11. The storage controller according to claim 9, further comprising:
a search volume for storing search information to be used in a file search, and
the data process is a process for creating search information and storing the search information in the search volume.

12. The storage controller according to claim 9, wherein the data process is a process for creating search information to be used in a file search, and for storing the search information in the search volume, and
the search volume is provided in a different storage controller.

13. The storage controller according to claim 9, wherein the data processor remote copies the results of the data process to a copy-destination volume in a different storage controller.

14. A storage system, including at least one storage controller which provides a primary volume and a backup volume to a plurality of host computers, the storage system comprising:
a backup controller for performing a differential backup, including:
a first backup data which is data of the primary volume at a first point in time;
a second backup data which is data of the primary volume at a second point in time; and
a third backup data which is data of the primary volume at a third point in time;
an updated-file detector for respectively detecting files, which have been updated by the respective host computers after a previous virus scan process on the primary volume;
a virus scanner which carries out a virus scan process for checking whether or not each of the detected respective updated files is infected with a computer virus:

a file restorer for restoring at least one file data in the primary volume with one of the backup data provided by the backup controller if the virus scanner determined the at least one file in the primary volume as an infected file, wherein the backup controller is configured to detect an updated block of the primary volume generated as a result of a file update request from the host computer;

wherein the backup controller is configured to manage:

the first backup data to be stored in the backup volume for providing the first backup data;

a first difference bitmap and a first difference data for providing the second backup data, wherein the first difference bitmap shows first updated blocks of the primary volume as result of a file update request from the host computer between the first point in time and the second point in time, the first difference data is data of the first updated blocks and to be stored in a difference volume; and a second difference bitmap and a second difference data for providing the third backup data, the second difference bitmap shows second updated blocks in the primary volume as result of a file update request from the host computer between the second point in time and the third point in time, the second difference data is data of the second updated blocks and to be stored in the difference volume, wherein, when the virus scanner carries out the virus scan process after the third point in time for files updated between the second point in time and third point in time, the updated-file detector identifies the second updated blocks, which are updated as a result of a file update request from the host computer between the second point in time and the third point in time, based on the second bitmap and detects the files updated between the second point in time and the third point in time by detecting the files including the identified second updated blocks, the virus scanner carries out the virus scan process for checking whether or not the each of the detected updated files is infected with a computer virus, wherein if the virus scanner determined the at least one detected file as an infected file after the third point in time among the files updated between the second point in time and third point in time, the file restorer restores the data of the infected at least one file with the second backup data provided by the backup controller;

a data processor for respectively executing data processes for creating search information to be used in a file search for the respective updated files detected by the updated-file detector;

a search volume for storing the search information; and a search unit for carrying out a file search based on the search information.

15. The storage system according to claim 14, wherein the backup controller, the updated-file detector, the virus scanner, the file restorer, and the data processor are respectively provided in a first storage controller, the search volume and search unit are respectively provided in a second storage controller, and the data processor sends and stores the search information to the search volume by means of a differential remote copy.

16. A method for controlling a storage controller which provides a primary volume to a host computer, comprising the steps of:

processing a file update request from the host computer;

performing a differential backup by using:

a first backup data which is data of the primary volume at a first point in time;

a second backup data which is data of the primary volume at a second point in time; and a third backup data which is data of the primary volume at a third point in time;

detecting files which have been updated by the host computer after a previous virus scan process on the primary volume;

checking whether or not each of the detected updated files is infected with a computer virus: and restoring at least one file data in the primary volume with one of the backup data provided by the backup controller if a virus scan process determined the at least one file in the primary volume as an infected file, detecting an updated block of the primary volume generated as a result of a file update request from the host computer;

managing the first backup data to be stored in the backup volume for providing the first backup data;

managing a first difference bitmap and a first difference data for providing the second backup data, wherein the first difference bitmap shows first updated blocks of the primary volume as result of a file update request from the host computer between the first point in time and the second point in time, the first difference data is data of the first updated blocks and to be stored in a difference volume; and managing a second difference bitmap and a second difference data for providing the third backup data, the second difference bitmap shows second updated blocks in the primary volume as result of a file update request from the host computer between the second point in time and the third point in time, the second difference data is data of the second updated blocks and to be stored in the difference volume, wherein, when the virus scan process is carried out after the third point in time for files updated between the second point in time and third point in time, identifying the second updated blocks, which are updated as a result of a file update request from the host computer between the second point in time and the third point in time, based on the second bitmap;

detecting the files updated between the second point in time and the third point in time by detecting the files including the identified second updated blocks, carrying out the virus scan process for checking whether or not the each of the detected updated files is infected with a computer virus, wherein if the virus scan process determined the at least one detected file as an infected file after the third point in time among the files updated between the second point in time and third point in time, restoring the data of the infected at least one file with the second backup data provided by the backup controller.

* * * * *